(12) United States Patent
Sugita et al.

(10) Patent No.: US 7,806,972 B2
(45) Date of Patent: Oct. 5, 2010

(54) OIL INK SET

(75) Inventors: Yukio Sugita, Yokohama (JP);
Mitsuyoshi Tamura, Yokohama (JP);
Fumie Yamazaki, Yokohama (JP);
Mitsuteru Yamada, Yokohama (JP);
Naoki Shiraishi, Yokohama (JP)

(73) Assignee: The Intec Inc., Kanagawa (JP)

( * ) Notice: Subject to any disclaimer, the term of this patent is extended or adjusted under 35 U.S.C. 154(b) by 0 days.

(21) Appl. No.: 12/410,272

(22) Filed: Mar. 24, 2009

(65) Prior Publication Data
US 2009/0235843 A1 Sep. 24, 2009

(30) Foreign Application Priority Data
Mar. 24, 2008 (JP) ............... 2008-074816

(51) Int. Cl.
*C09D 11/00* (2006.01)
(52) U.S. Cl. .................. 106/31.6; 106/31.86
(58) Field of Classification Search ............ 106/31.27, 106/31.6, 31.58, 31.86
See application file for complete search history.

(56) References Cited

U.S. PATENT DOCUMENTS

| | | | |
|---|---|---|---|
| 7,125,447 B2 | 10/2006 | Sugita et al. | 106/31.58 |
| 7,462,231 B2 | 12/2008 | Koganehira et al. | 106/31.6 |
| 2004/0266907 A1* | 12/2004 | Sugita et al. | 523/160 |
| 2005/0284329 A1* | 12/2005 | Jackson et al. | 106/31.6 |
| 2005/0284330 A1* | 12/2005 | Jackson | 106/31.6 |
| 2007/0266887 A1 | 11/2007 | Koganehira et al. | 106/31.6 |
| 2008/0182085 A1* | 7/2008 | Oyanagi et al. | 428/195.1 |

FOREIGN PATENT DOCUMENTS

| | | | |
|---|---|---|---|
| EP | 1892105 A1 * | 2/2008 | |
| JP | 2007-297595 | 11/2007 | |
| WO | WO 2004/007626 A1 | 1/2004 | |

* cited by examiner

*Primary Examiner*—Jerry Lorengo
*Assistant Examiner*—Veronica Faison Gee
(74) *Attorney, Agent, or Firm*—Hogan Lovells US LLP

(57) ABSTRACT

The object of the invention is to provide an oil ink set capable of obtaining images having high color reproduction capabilities and high color saturation in particular. The oil ink set of the invention comprises a firsts a second, and a third oil ink having a wavelength region in which the reflectivity of each oil ink on a recording medium changes from 80% to 5% in the wavelength range of 400 nm to 700 nm. In this wavelength region, the reflectivity of the first oil ink is continuously higher than that of the first oil ink, and in the wavelength in which the reflectivity of the second oil ink changes from 80% to 5%, the reflectivity of the third oil ink is continuously higher than that of the second oil ink. Moreover, the coloring materials in the first, the second and the third oil inks are all different.

24 Claims, 10 Drawing Sheets

OIL INK SET

CROSS-REFERENCE TO THE RELATED APPLICATIONS

This application claims the benefit of priority under 35 USC 119 of Japanese Patent Application No. 2008-074816 filed on Mar. 24, 2008, the entire contents of which is incorporated herein by reference.

ART FIELD

The present invention relates generally to an inkjet recording oil ink set, and more particularly to an oil ink set capable of obtaining images having high color reproduction capabilities and high color saturation on polyvinyl chloride base materials.

BACKGROUND ART

In a conventional inkjet recording mode, in response to electric signals from computers or the like, ink droplets are jetted at fast speed from a print head or spray nozzle onto the material to be recorded, applying prints onto the ink-receiving layer of that material. This inkjet recording mode, because of running quiet and being capable of fast printing, is gaining popularity for use on copiers, facsimiles, posters, displays or the like. Inks used in the inkjet recording mode must suffer from no change with time, maintain the sufficient density of images stably over an extended period of time, and allow images printed onto the material to be recorded to excel more in the ability to reproduce the original.

In general, inks have been prepared by blending coloring materials such as dyes or pigments, a dispersant for dispersing them and a solvent, optionally with additives. However, oil inkjet printers are often used out of doors, and so weight is given to the robustness of the coloring materials.

Applicant has already filed a patent application (Patent Publication 1) for an oil ink composition for inkjet recording purposes, which is well fit for printing onto polyvinyl chloride base materials and improved in terms of all the quality of prints, stability upon printing, the ability of prints to be dried, and ink storage ability. This oil ink composition uses as solvents polyoxyethylene glycol dialkyl ether solvents and/or cyclic ester solvents, and is now used even indoors because of being of great safety. On the other hand, aqueous inkjet printers are mainly used indoors, and so weight is given to color saturation rather than robustness, as shown typically in Patent Publication 2. Oil ink compositions going into indoor applications, too, must have color reproduction capabilities and color saturation on a par with those of aqueous inks and produce images having high color reproduction capabilities and color saturation. For oil inks, there is mounting demand for improvements in color reproduction capabilities on recording media.

Patent Publication 1: WO 04/007626 Pamphlet
Patent Publication 2: JP(A) 2007-297595

SUMMARY OF THE INVENTION

Object of the Invention

The present invention has for its object to provide an oil ink set in particular that is suitable for printing onto a polyvinyl chloride base material and excels more in terms of the quality of prints, stability on printing, the ability of prints to be dried, and ink storage stability, and an oil ink set in particular that is capable of obtaining images much more improved in terms of color reproducibility and color saturation.

Means for Accomplishing the Object

According to the first aspect of the invention, there is an oil ink set provided in which at least a first oil ink, a second oil ink and a third oil ink each contain a coloring material and are combined together, characterized in that said first, said second, and said third oil ink has a wavelength region in which the reflectivity of each oil ink on a recording medium changes from 80% to 5% in a wavelength range of 400 nm to 700 nm; in the wavelength region where the reflectivity of said first oil ink changes from 80% to 5%, the reflectivity of said second oil ink is continuously higher than that of said first oil ink, and in the wavelength region where the reflectivity of said second oil ink changes from 80% to 5%, the reflectivity of said third oil ink is continuously higher than that of said second oil ink; and the coloring materials in said first, said second and said third oil ink are all different.

The first aspect of the invention is further characterized in that said first, said second, and said third oil ink has a hue angle in a range of 0° to 110° or 330° to 360° as expressed in terms of the CIELAB.

The first aspect of the invention is further characterized in that said first oil ink is a magenta ink, and said third oil ink is a yellow ink.

The first aspect of the invention is further characterized in that said first oil ink is an oil ink containing pigment red 122.

The first aspect of the invention is further characterized in that said second oil ink is an orange ink or red ink.

The first aspect of the invention is further characterized in that said oil ink set contains a cyan ink and/or a black ink.

According to the second aspect of the invention, there is an oil ink set provided in which at least a fourth oil ink, a fifth oil ink and a sixth oil ink each contain a coloring material and are combined together, and which is characterized in that as a wavelength where the reflectivity of each oil ink on a recording medium becomes 5% in a wavelength range of 400 nm to 700 nm, said sixth oil ink has one wavelength C, said fourth oil ink has one or two wavelengths: where there is one wavelength, that wavelength is represented by D and where there are two wavelengths, the longer one is represented by D, and said fifth oil ink has two wavelengths where the shorter one is represented by E and the longer one is represented by F, wherein the reflectivity of said sixth oil ink is continuously 5% or lower in a wavelength range shorter than the wavelength C, the reflectivity of said fourth oil ink is continuously 5% or lower in a wavelength range longer than the wavelength D, and the wavelengths C, D, E and F satisfy a relation: E<C<D<F.

The second aspect of the invention is further characterized in that said fourth, said fifth, and said sixth oil ink has a hue angle in a range of 80° to 270° as expressed in terms of the CIELAB.

The second aspect of the invention is further characterized in that said fourth oil ink is a cyan ink, and said sixth oil ink is a yellow ink.

The second aspect of the invention is further characterized in that the fourth oil ink contains pigment blue 15:4.

The second aspect of the invention is further characterized in that said fifth oil ink is a green ink.

The second aspect of the invention is further characterized in that said fifth oil ink contains pigment green 36 or pigment green 7.

The second aspect of the invention is further characterized that the oil ink set contains a magenta ink and/or a black ink.

According to the third aspect of the invention, there is an oil ink set, characterized by comprising an oil ink set in which at least a first oil ink, a second oil ink and a third oil ink each contain a coloring material and are combined together, and said first, said second, and said third oil ink has a wavelength region where the reflectivity of each oil ink on a recording medium changes from 80% to 5% in a wavelength range of 400 nm to 700 nm, wherein in the wavelength region where the reflectivity of said first oil ink changes from 80% to 5%, the reflectivity of said second oil ink is continuously higher than that of said first oil ink, and in the wavelength region where the reflectivity of said second oil ink changes from 80% to 5%, the reflectivity of said third oil ink is continuously higher than that of said second oil ink, and the coloring materials in said first, said second and said third oil ink are all different; and an oil ink set in which at least a fourth oil ink, a fifth oil ink and a sixth oil ink each contain a coloring material and are combined together, wherein as a wavelength where the reflectivity of each oil ink on a recording medium becomes 5% in a wavelength range of 400 nm to 700 nm, said sixth oil ink has one wavelength C, said fourth oil ink has one or two wavelengths: where there is one wavelength, that wavelength is represented by D and where there are two wavelengths, the longer one is represented by D, and said fifth oil ink has two wavelengths where the shorter one is represented by E and the longer one is represented by F, wherein the reflectivity of said sixth oil ink is continuously 5% or lower in a wavelength range shorter than the wavelength C, the reflectivity of said fourth oil ink is continuously 5% or lower in a wavelength range longer than the wavelength D, and the wavelengths C, D, E and F satisfy a relation: E<C<D<F; and wherein the same oil ink is used for said third and said sixth oil ink, and five oil inks at least comprising said first, said second, said third, said fourth and said fifth oil ink are combined together.

The third aspect of the invention is further characterized in that said first, said second, and said third oil ink has a hue angle in a range of 0° to 110° or 330° to 360°, and said fourth, said fifth, and said sixth oil ink has a hue angle in a range of 80° to 270°, as expressed in terms of the CIELAB.

The third aspect of the invention is further characterized in that said first oil ink is a magenta ink; said second oil ink is an orange ink or red ink; said third, and said sixth oil ink is a yellow ink; said fourth oil ink is a cyan ink; and said fifth oil ink is a green ink.

The third aspect of the invention is further characterized in that the oil ink set contains a black ink.

Throughout the first, second and third aspects of the invention, each oil ink is further characterized by containing at least 30% by mass of a polyoxyethylene glycol dialkyl ether represented by the following general formula (1) and/or a polyoxyethylene (alkylene) glycol alkyl ether acetate represented by the following general formula (2).

$$X_1-(OC_2H_4)_n-OX_2 \qquad \text{General Formula (1)}$$

Here $X_1$ and $X_2$ are each an alkyl group having 1 to 4 carbon atoms and may be identical or different, and n stands for integer of 2, 3, and 4.

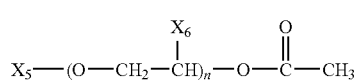
General Formula (2)

In Formula (2), $X_5$ is an alkyl group, $X_6$ is a hydrogen atom or an alkyl group, and n stands for an integer of 1, 2, 3, and 4.

Each oil ink is further characterized by containing at least 50% by mass of a mixed solvent wherein 0.02 to 4 parts by mass of a cyclic ester solvent represented by the following general formula (3) are mixed with 1 part by mass of the solvent(s) represented by the general formulae (1) and (2).

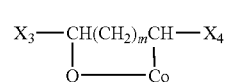
General Formula (3)

In the general formula (3), $X_3$ and $X_4$ are each an alkyl or alkenyl group having 1 to 7 carbon atoms and may be identical or different, and m stands for an integer of 1, 2, and 3.

The first, the second, and the third aspect of the invention is further characterized in that said cyclic ester solvent is a γ-lactone solvent.

The first, the second, and the third aspect of the invention is further characterized in that said γ-lactone solvent is γ-valerolactone or γ-butyrolactone.

The first, the second, and the third aspect of the invention is further characterized in that each oil ink contains a (meth) acrylic resin as a fixing resin.

The first, the second, and the third aspect of the invention is further characterized in that said (meth) acrylic resin is a homopolymer of methyl (meth)acrylate or a copolymer of methyl (meth)acrylate and butyl (meth) acrylate.

The first, the second, and the third aspect of the invention is further characterized in that said (meth)acrylic resin contains a (meth)acrylic resin obtained by solution polymerization occurring in the poly-oxyethylene glycol dialkyl ether solvent represented by the general formula (1) and/or the poly-oxy-ethylene (alkylene) glycol alkyl ether acetate solvent represented by the aforesaid general formula (2) using a radical polymerization initiator.

The firsts the second, and the third aspect of the invention is further characterized in that said (meth) acrylic resin has a glass transition temperature (Tg) of 70° C. or higher.

The first, the second, and the third aspect of the invention is further characterized in that said (meth) acrylic resin has a weight-average molecular weight of 8,000 to 100,000.

The first, the second, and the third aspect of the invention is further characterized in that as said fixing resin, a copolymer resin of vinyl chloride/vinyl acetate and/or a cellulose resin are used in addition to the (meth) acrylic resin.

The first, the second, and the third aspect of the invention is further characterized in that said oil ink set is used for recording onto a polyvinyl chloride base material.

ADVANTAGES OF THE INVENTION

The oil ink set of the invention is well fit for printing onto polyvinyl chloride base materials, and excel more in the quality of prints, stability on printing, the ability of prints to be dried, and ink storage stability. In addition, the use of the first oil ink set of the invention ensures that the color reproduction area is at least 130% higher than that of YM in conventional four-color printing using yellow, magenta, cyan and black (YMCK); the use of the second oil ink set of the invention ensures that the color reproduction area is at least 110 to 120% higher than that of YC in conventional four-color printing using yellow, magenta, cyan and black (YMCK); and the use of the third oil ink set of the invention ensures that the color reproduction area is at least 120% higher than that of YMC, except that of MC, in conventional four-color printing using yellow, magenta, cyan and black (YMCK), making it possible to obtain images having higher color saturation.

BEST MODE FOR CARRYING OUT THE INVENTION

Figure 1:
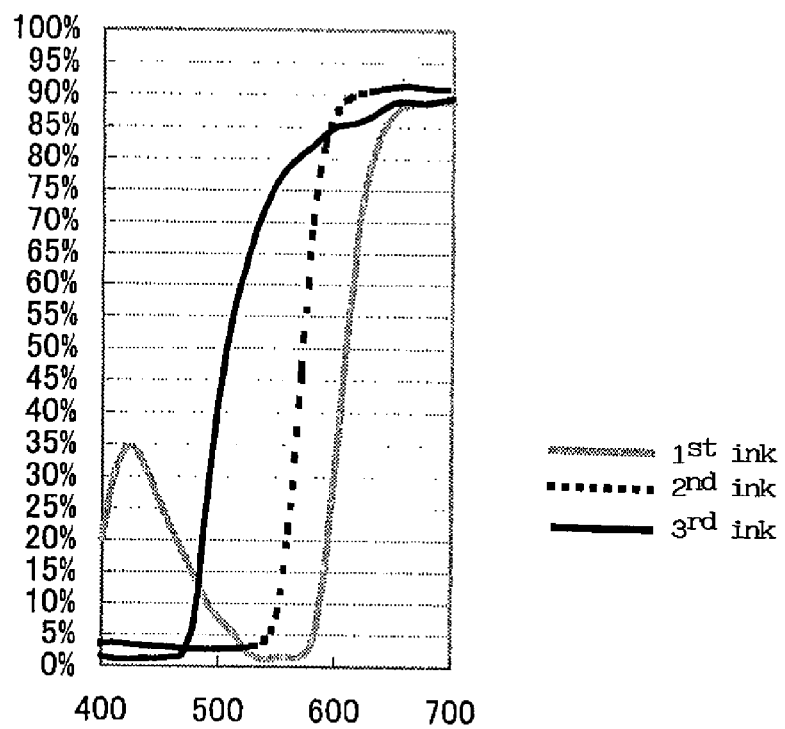
FIG. 1 is a diagram for the results of reflectivity spectra of the respective inks forming the oil ink set of Example 1, as measured on a recording medium in the wavelength range of 400 nm to 700 nm.
Figure 2:
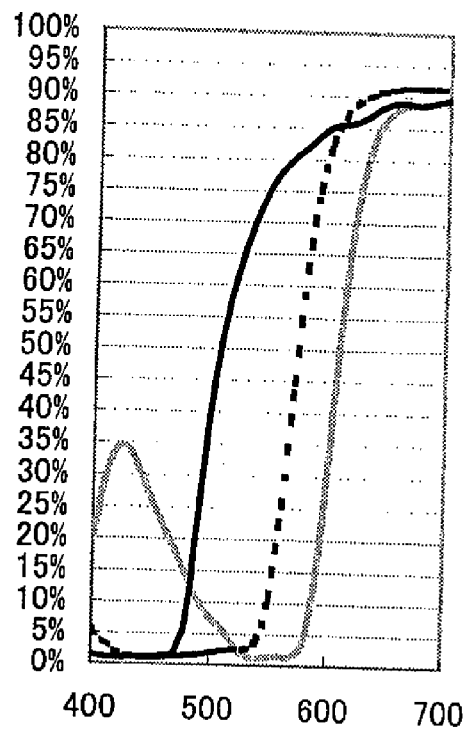
FIG. 2 is a diagram for the results of reflectivity spectra of the respective inks forming the oil ink set of Example 2, as measured on a recording medium in the wavelength range of 400 nm to 700 nm.
Figure 3:
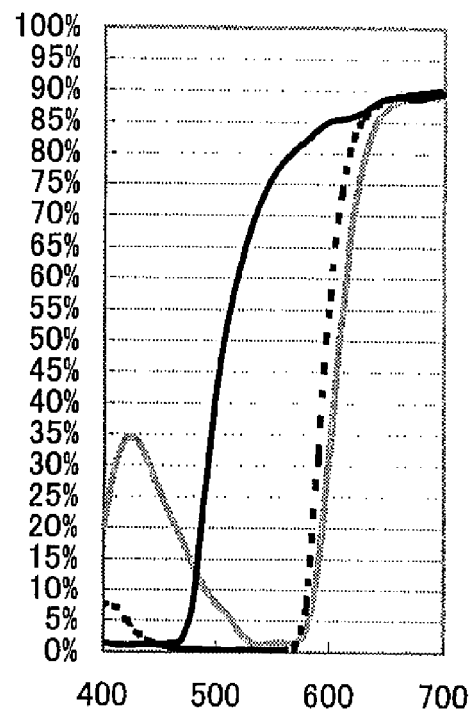
FIG. 3 is a diagram for the results of reflectivity spectra of the respective inks forming the oil ink set of Example 3, as measured on a recording medium in the wavelength range of 400 nm to 700 nm.
Figure 4:
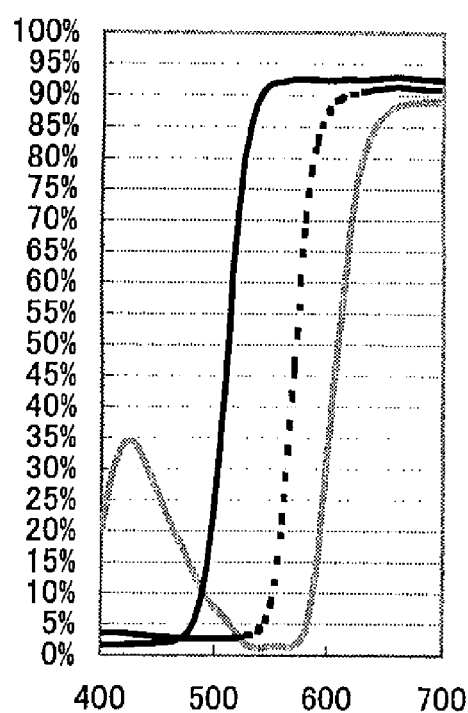
FIG. 4 is a diagram for the results of reflectivity spectra of the respective inks forming the oil ink set of Example 4, as measured on a recording medium in the wavelength range of 400 nm to 700 nm.
Figure 5:
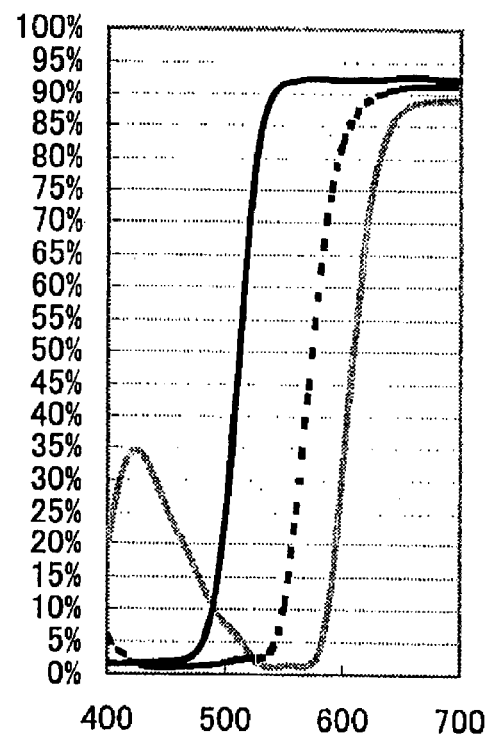
FIG. 5 is a diagram for the results of reflectivity spectra of the respective inks forming the oil ink set of Example 1, as measured on a recording medium in the wavelength range of 400 nm to 700 nm.
Figure 6:
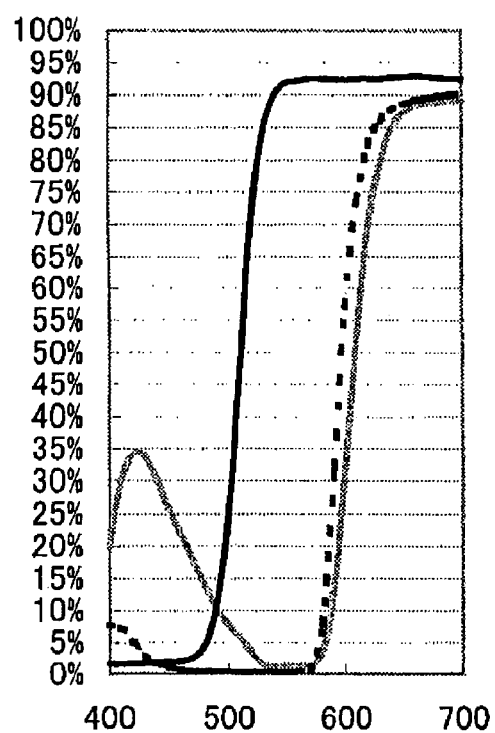
FIG. 6 is a diagram for the results of reflectivity spectra of the respective inks forming the oil ink set of Example 2, as measured on a recording medium in the wavelength range of 400 nm to 700 nm.

The first oil ink set of the invention is now explained with reference to FIG. 1. FIG. 1 is a diagram for the results of reflectivity spectra of the first, the second, and the third ink forming the oil ink set of Example 1, as measured in the wavelength range of 400 nm to 700 nm.

As can be seen from FIG. 1, the first oil ink set of the invention has reflection characteristics such that the first, the second, and the third oil ink has a wavelength region where, in the wavelength range of 400 nm to 700 nm, the reflectivity of each oil ink changes 80% to 5% on a recording medium. More specifically, the first oil ink has a reflectivity of 80% at a wavelength of about 630 nm and a reflectivity of 5% at about 580 nm: it is found that the wavelength region for the first oil ink where the reflectivity changes from 80% to 5% is between about 580 nm and about 630 μm. And in this wavelength region of about 580 nm to about 630 nm, the reflectivity of the second oil ink is continuously higher than that of the first oil ink. It is also found that the wavelength region for the second oil ink where the reflectivity changes from 80% to 5% is between about 550 nm and about 580 nm, and in this wavelength region, the reflectivity of the third oil ink is continuously higher than that of the second oil ink.

Figure 7:
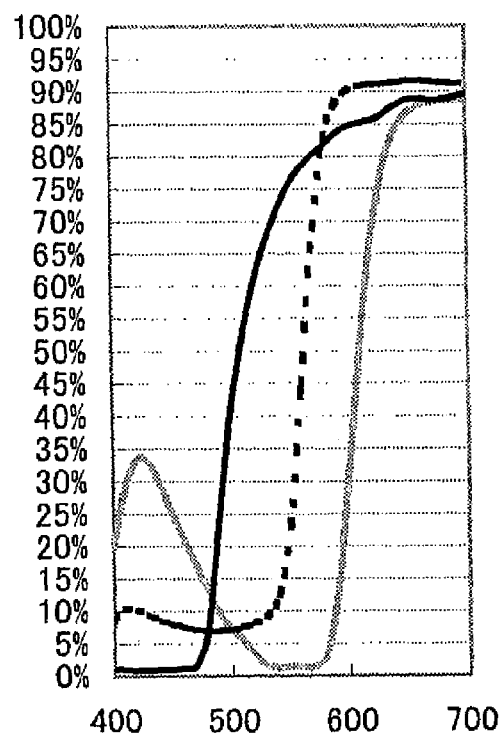
FIG. 7 is a diagram for the results of reflectivity spectra of the respective inks forming the oil ink set of Comparative Example 1, as measured on a recording medium in the wavelength range of 400 nm to 700 nm.
Figure 8:
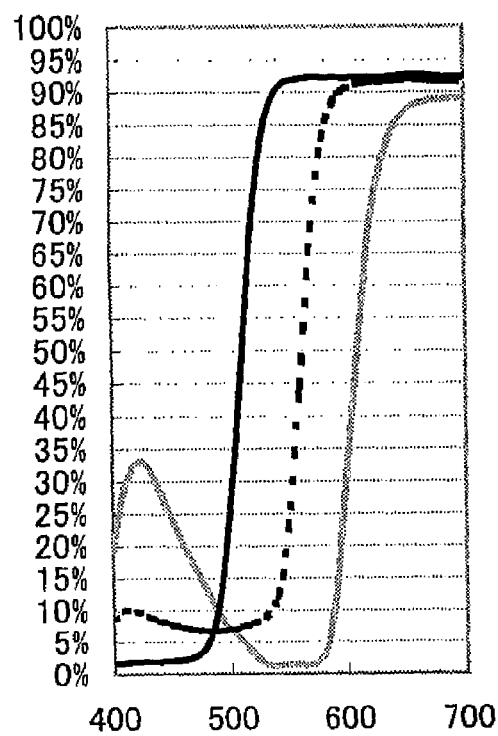
FIG. 8 is a diagram for the results of reflectivity spectra of the respective inks forming the oil ink set of Comparative Example 2, as measured on a recording medium in the wavelength range of 400 nm to 700 nm.

On the other hand, FIG. 7 is a diagram for the results of reflectivity spectra of the first, the second, and the third ink forming the oil ink set of Comparative Example 1 to be described later, as measured in the wavelength range of 400 to 700 nm. As can be seen from FIG. 7, the comparative oil ink set has a pigment concentration of the second oil ink (Ink 10) set at 1% lower than 3% in Example 1 (Ink 3), and there is none of the wavelength region where the reflectivity changes from 80% to 5% on the recording medium in the wavelength range of 400 nm to 700 nm: the reflectivity is not less than about 7%. FIG. 8 is a diagram for the results of reflectivity spectra of the first, the second, and the third ink forming the oil ink set of Comparative Example 2 to be described later, as measured in the wavelength range of 400 nm to 700 nm. As can be seen from FIG. 8, the comparative oil ink set has a pigment concentration of the second oil ink (Ink 10) set at 1% lower than 3% in Example 4 (Ink 3), and there is none of the wavelength region where the reflectivity changes from 80% to 5% on the recording medium in the wavelength range of 400 nm to 700 nm: the reflectivity is not less than about 7%. That is, the oil ink sets of Comparative Examples 1 and 2 do not satisfy the inventive specific reflectivity relation.

The first oil ink set of the invention may satisfy the specific reflectivity relation in the wavelength range of 400 n m to 700 nm. Any desired ink species may be used: by way of example but not by way of limitation, the first, the third, and the second oil ink may be a magenta ink, a yellow ink, and an orange ink, respectively. The pigment in the magenta ink may be exemplified by pigment red 122, and that in the yellow ink may be exemplified by pigment yellow 150, 180. The orange ink that is the second oil ink may be exemplified by pigment orange 64, 71, pigment red 254 or the like.

The first oil ink set of the invention has a combination of the second oil ink having a specific reflectivity spectrum with YM, thereby enabling the color reproduction area for YM to be enhanced. As can be seen from a comparison with Comparative Examples 1 and 2 to be described later, the color reproduction area for YM is affected just only by specifying the ink species but also by its concentration.

The yellow ink, and the magenta ink has a hue angle of about 80° to about 110°, and about 330° to about 360°, respectively, as defined in the CIELAB color space on the recording medium. However, the combination of the first, the second and the third oil ink in the first oil ink set of the invention has a hue angle of 0° to 110° or 330° to 360°, as represented in terms of the CIELAB.

The first oil ink set may further contain a cyan ink and/or a black ink. For the cyan ink there is the mention of pigment blue 15:4, and for the black ink there is the mention of pigment black 7.

Figure 10:
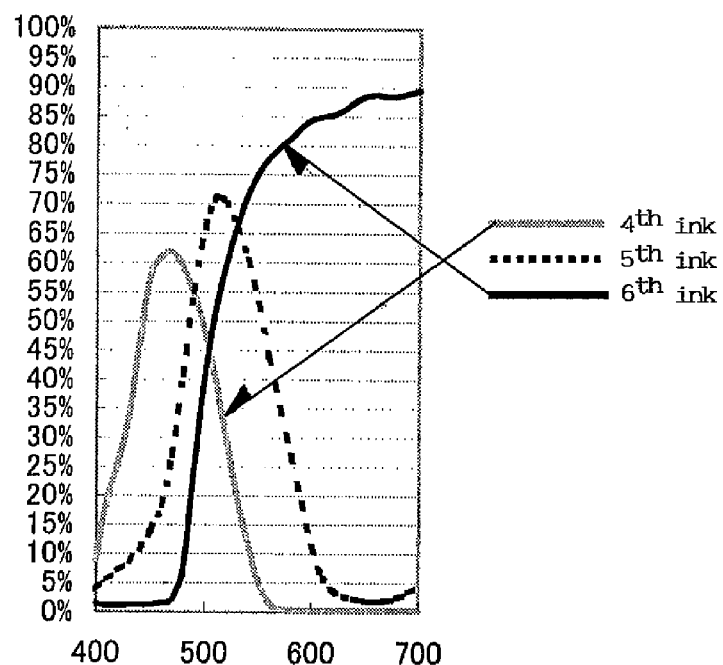
FIG. 10 is a diagram for the results of reflectivity spectra of the respective inks forming the oil ink set of Example 7, as measured on a recording medium in the wavelength range of 400 nm to 700 nm.
Figure 11:
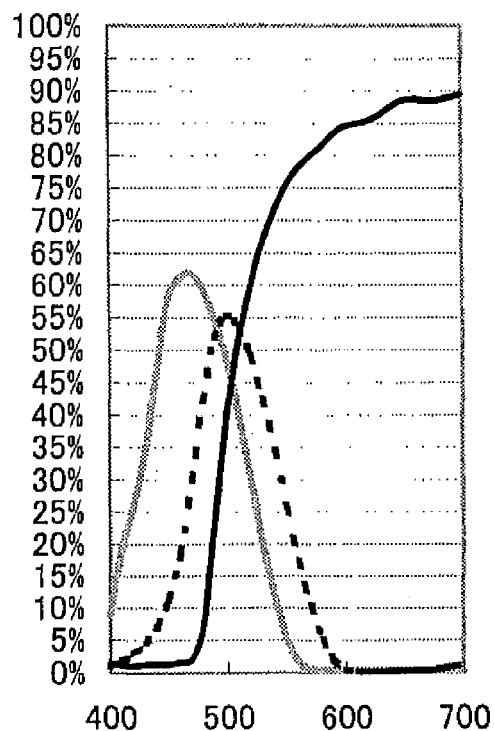
FIG. 11 is a diagram for the results of reflectivity spectra of the respective inks forming the oil ink set of Example 8, as measured on a recording medium in the wavelength range of 400 nm to 700 nm.
Figure 12:
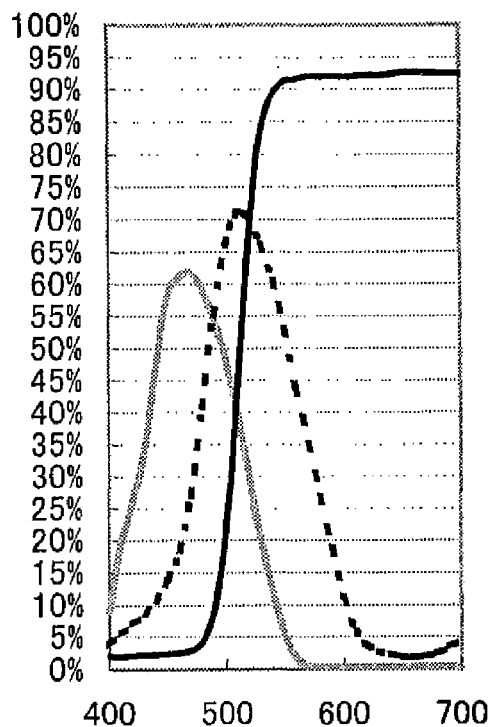
FIG. 12 is a diagram for the results of reflectivity spectra of the respective inks forming the oil ink set of Example 9, as measured on a recording medium in the wavelength range of 400 nm to 700 nm.
Figure 13:
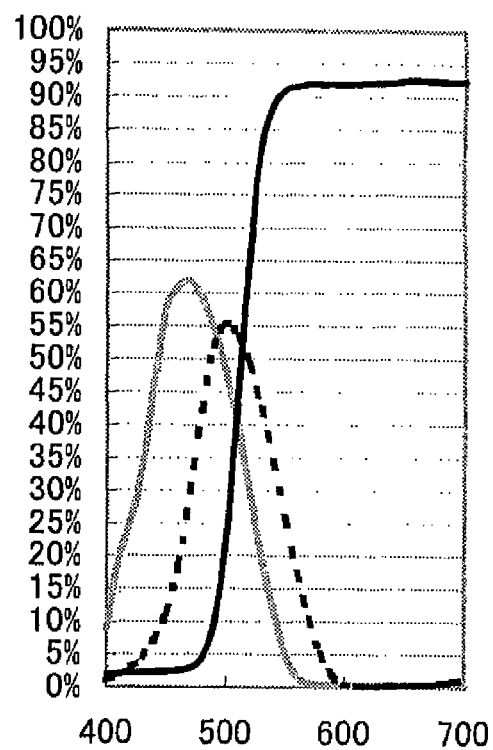
FIG. 13 is a diagram for the results of reflectivity spectra of the respective inks forming the oil ink set of Example 10, as measured on a recording medium in the wavelength range of 400 nm to 700 nm.
Figure 14:
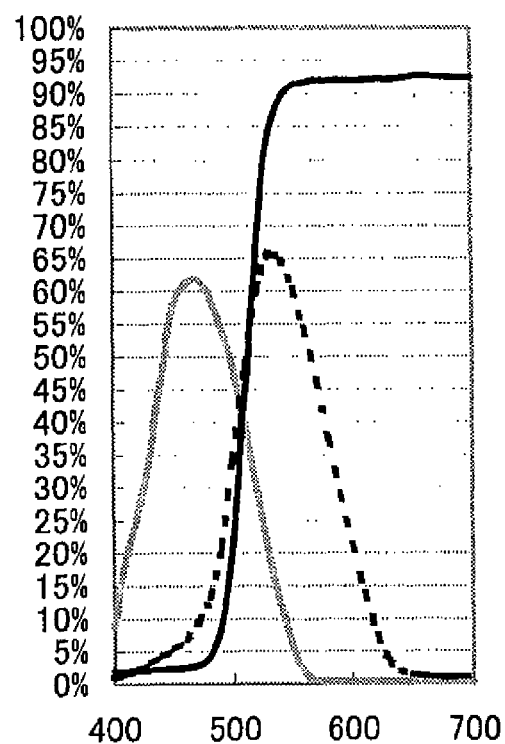
FIG. 14 is a diagram for the results of reflectivity spectra of the respective inks forming the oil ink set of Example 11, as measured on a recording medium in the wavelength range of 400 nm to 700 nm.

The second oil ink set of the invention is now explained with reference to FIG. 10. FIG. 10 is a diagram for the results of reflectivity spectra of the fourth, the fifth, and the sixth ink forming the oil ink set of Example 7 to be described later, as measured in the wavelength range of 400 nm to 700 nm. The reflectivity spectra of the oil inks were measured as in the first oil ink set.

As shown, the second oil ink set of the invention comprises the fourth, the fifth and the sixth oil ink, and has reflection characteristics such that as the wavelength where the reflectivity of each oil ink becomes 5% on the recording medium in the wavelength range of 400 nm to 700 nm, the sixth oil ink has one wavelength: about 480 nm (C); the fourth oil ink has one wavelength: about 550 nm (D); and the fifth oil ink has two wavelengths (about 400 nm and about 605 nm) where the shorter one is about 400 nm (E) and the longer one is about 605 nm (F). It is here noted that when the fourth oil ink has two wavelengths, the longer one is presumed to be D. And the reflectivity of the sixth oil ink is continuously less than 5% in a wavelength range shorter than the wavelength D, and the reflectivity of the fourth oil ink is continuously less than 5% in a wavelength range longer than the wavelength D. Further, there is a relation: E<C<D<F satisfied between the wavelengths C, D, E and F.

Figure 15:
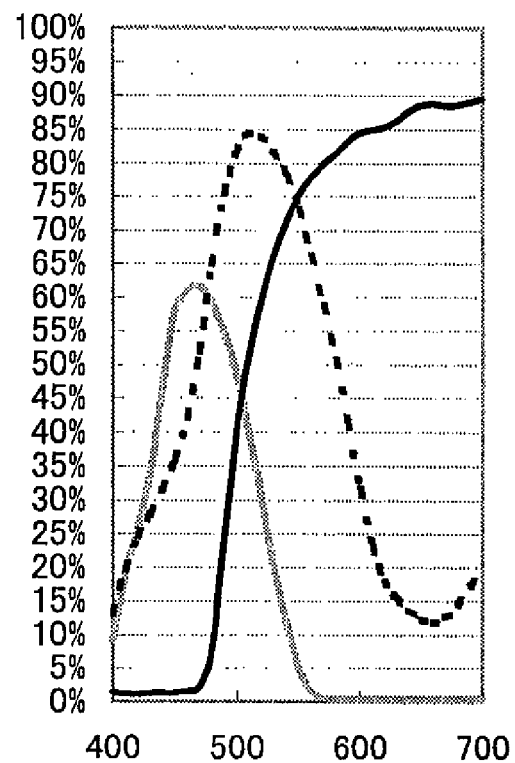
FIG. 15 is a diagram for the results of reflectivity spectra of the respective inks forming the oil ink set of Comparative Example 3, as measured on a recording medium in the wavelength range of 400 nm to 700 nm.
Figure 16:
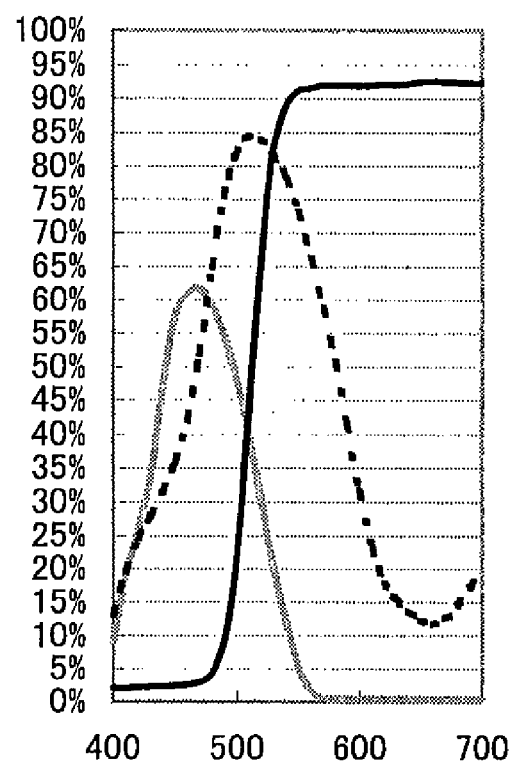
FIG. 16 is a diagram for the results of reflectivity spectra of the respective inks forming the oil ink set of Comparative Example 4, as measured on a recording medium in the wavelength range of 400 nm to 700 nm.

On the other hand, FIG. 15 is a diagram for the reflectivity spectra of the fourth, the fifth and the sixth oil ink forming the oil ink set of Comparative. Example 3 to be described later, as measured in the wavelength range of 400 nm to 700 nm. As shown, the oil ink set of Comparative Example 3 has a pigment concentration of the fifth oil ink (Ink 12) set at 1% lower than 3% in Example 7 (Ink 8), and it is seen that the reflectivity does not become 5% on the recording medium in the wavelength range of 400 nm to 700 nm. FIG. 16 is a diagram for the reflectivity spectra of the fourth, the fifth and the sixth ink forming the oil ink set of Comparative Example 4 to be described later, as measured in the wavelength range of 400 nm to 700 nm. As shown in FIG. 16, the oil ink set of Comparative Example 4 has a pigment concentration of the fifth oil ink (Ink 12) set at 1% lower than 3% in Example 7 (Ink 8), and the reflectivity does not become 5% on the recording medium in the wavelength range of 400 nm to 700 nm. In any case, there is none of the specific reflectivity relation in the invention.

The second oil ink set of the invention may satisfy the specific reflectivity relation in the wavelength range of 400 nm to 700 nm. Any desired ink species may be used: by way of example but not by way of limitation, the fourth oil ink may be a cyan ink, the sixth oil ink may be a yellow ink, and the fifth oil ink may be a green ink. The pigment in the cyan ink may be exemplified by pigment blue 15:4. For instance, the yellow ink, and the green ink that is the fifth oil ink may be exemplified by pigment yellow 150, 180, and pigment green 7, 36, respectively.

The yellow ink, and the cyan ink has a hue angle of about 80° to about 110°, and about 230° to about 270° respectively, as defined in the CIELAB color space on the recording medium. However, the combination of the fourth, the fifth, and the sixth oil ink in the second oil ink set of the invention has a hue angle ($\beta$) of 80° to 270°, as represented in terms of the CIELAB.

The second oil ink set may further contain a magenta ink and/or a black ink. For the magenta ink there is the mention of pigment red 122, and for the black ink there is the mention of pigment black 7.

The third oil ink set of the invention comprises a combination of the first oil ink set comprising the first, the second, and the third oil ink with the second oil ink set comprising the fourth, the fifth, and the sixth oil ink. When the first and second oil ink sets are combined together, the same oil ink is used for the third, and the sixth oil ink. Thus, the third oil ink set of the invention comprises at least five oil inks: the first, the second, the third, the fourth, and the fifth oil ink.

For the third oil ink set of the invention, it is preferable that the first oil ink is exemplified by a magenta ink, the second oil ink is exemplified by an orange or red ink, the third oil ink is exemplified by a yellow ink, the fourth oil ink is exemplified by a cyan ink, the fifth oil ink is exemplified by a green ink, and the sixth oil ink is exemplified by a yellow ink. For both the third and the sixth oil ink the yellow ink is used: the sixth ink is dispensed with, and at least five inks may have the specific interrelations with respect to reflectivity. For specific coloring materials in the respective inks, use may be made of those mentioned above for the first and the second oil inks.

For the third oil ink set of the invention, it has been found that the color reproduction area for YMC can be enhanced by combining the second and fifth oil inks having specific reflectivity spectra with YMC.

The yellow, the magenta, and the cyan ink has a hue angle of about 80° to about 110°, about 330° to about 360°, and about 230° to about 270°, respectively, as defined on the CIELAB space on the recording medium. In the third oil ink set of the invention, however, the first, the second, and the third oil ink has a hue angle in the range of 0° to 110° or 330° to 360°, respectively, and the fourth, the fifth, and the sixth oil ink has a hue angle in the range of 80° to 270°, respectively.

The third oil ink set may further contain a black ink, for which there is the mention of pigment black 7.

Referring here to the respective oil ink sets of the invention, the amount of the pigment in each oil ink may be regulated to the range of 1% by mass to 10% by mass, and preferably 2% by mass to 8% by mass. As the amount of the pigment in the ink is below 1% by mass, no sufficient print density is obtained, nor is any desired reflectivity achieved, as mentioned above. As that amount exceeds 10% by mass, on the other hand, there are some limitations on the amount of ink additives such as humectants to be added into the ink because of an ink viscosity requirement, which may otherwise cause nozzles in an inkjet head to be likely to be clogged up or ink concentrations to grow high, failing to achieve the ability of the ink to be stably jetted.

Referring now to the dispersant, it is preferable to use a high-molecular dispersant. The high-molecular dispersant, for instance, includes a main chain comprising a polyester, polyacrylic, polyurethane, polyamine or polycaprolactone and a side chain comprising a polar group such as an amino, carboxyl, sulfone or hydroxyl group, although preference is given to polyester dispersants. For instance, use may be made of "SOLSPERSE 32000", "SOLSPERSE 20000", "SOLSPERSE 24000" and "SOLSPERSE 71000", all available from the Lubrizol Cooperation, and "Ajisper PB821" and "Ajisper PB822", all available from Ajinomoto Fine-Techno Co., Inc. The dispersant should preferably be added in an amount of 0.03 parts by mass to 5 parts by mass, and especially 0.05 parts by mass to 5 parts by mass per 1 part by mass of pigment, and contained in an amount of 0.1% by mass to 30% by mass, and especially 0.5% by mass to 20% by mass per ink.

The (meth)acrylic resin is added as the fixing resin into the ink composition. It is here noted that the term "(meth)acrylic resin" means an acrylic resin or a meth-acrylic resin. The acrylic resin, for instance, includes homopolymers or copolymers of alkyl-(meth)acrylates such as ethyl-, propyl- or butyl-(meth)acrylates, and hydroxy-alkyl (meth)acrylates such as hydroxymethyl-, hydroxy-ethyl-, hydroxypropyl-, hydroxybutyl-, and hydroxypentyl-(meth)acrylates, although preference is given to a homopolymer of methyl (meth)acrylate, a copolymer of methyl (meth)acrylate and ethyl (meth)acrylate, and a copolymer of methyl (meth)acrylate and propyl (meth)acrylate.

There are also commercially available (meth)acrylic resins such as "Paraloid B99N" (methyl methacrylate/butyl methacrylate copolymer having a Tg of 82° C. and a weight-average molecular weight of 15,000) and "Paraloid B60" (methyl methacrylate/butyl methacrylate having a Tg of 75° C. and a weight-average molecular weight of 50,000), all available from Rohm and Haas Co., Ltd.

The (meth)acrylic resin should preferably be obtained by solution polymerization using a radical polymerization initiator in the polyoxyethylene glycol dialkyl ether represented by the general formula (1) or the polyoxyethylene (alkylene) glycol alkyl ether acetate represented by the general formula (3).

By producing the (meth)acrylic resin by solution polymerization, it is possible to solubilize and use the (meth)acrylic resin hardly dissolvable in the polyoxy-ethylene glycol dialkyl ether or the polyoxyethylene (alkylene) glycol alkyl ether acetate. It is thus possible to obtain an inkjet recording oil ink composition that excels more in the ability of prints to be dried, resistance to scuffing and the ability to re-dissolve.

While the (meth)acrylic resin may be optional in terms of molecular weight and glass transition temperature (Tg), it has a weight-average molecular weight as calculated on a polystyrene basis of 8,000 to 100,000, and preferably 10,000 to 60,000. The (meth)acrylic resin has preferably a glass transition temperature (Tg) of at least 70° C., and especially at least 80° C. It is here noted that the upper limit to the glass transition temperature is about 120° C. Maintaining the weight-average molecular weight and Tg within the aforesaid ranges is preferable, because it works much in favor of prints having good ink storage stability, and the ability of ink to be dried and shielded off.

The (meth)acrylic resin in the ink composition should preferably be contained in the ink composition in an amount of 0.01 part by mass to 5 parts by mass, and especially 0.05 parts by mass to 5 parts by mass per 1 part by mass of pigment.

If required, other resins may be used together with the (meth)acrylic resin. The other resins, for instance, include styrene-acrylic resin, rosin-modified resin, phenol resin, terpene resin, polyester resin, polyamide resin, epoxy resin, vinyl chloride-vinyl acetate copolymer resin, cellulose resin such as cellulose acetate butyrate resin, and vinyl toluene-α-methylstyrene copolymer resin. For the vinyl chloride-vinyl acetate copolymer resin, for instance, there is the mention of "UCAR$^{TH}$ VAGC Solution Vinyl Resin (abbreviated as VAGC)" (hydroxyalkyl acrylate-modified vinyl chloride/vinyl acetate copolymer having a Tg of 65° C. and a weight-average molecular weight of 24,000) made by Dow Chemical Co.

Whenever necessary, stabilizers such as anti-oxidants and ultraviolet absorbers, surface active agents and so on may be used. Preferable antioxidants, for instance, include BHA (2,3-dibutyl-4-oxyanisole) and BHT (2,6-di-t-butyl-p-cresol) that are used in an amount of preferably 0.01% by mass to 3.00% by mass per the total amount of the ink composition. Benzophenone and benzotriazole compounds are exemplars of the ultraviolet absorber that is used in an amount of preferably 0.01% by mass to 0.5% by mass per the total amount of the ink composition. For the surface active agent, every surface active agent from anionic to cationic to amphoteric to nonionic ones may be used in an amount of 0.5% by mass to 4.0% by mass per the total amount of the ink composition.

The solvent in the inventive inkjet recording oil green ink composition may contain a glycol ether dialkyl ether or a polyoxyethylene (alkylene) glycol alkyl ether acetate. The glycol ether dialkyl ether is preferably exemplified by polyoxyethylene glycol dimethyl ether, polyoxyethylene glycol diethyl ether or polyoxyethylene glycol ethyl methyl ether represented by the general formula (1), although diethylene glycol diethyl ether, and tetraethylene glycol dimethyl ether is preferred. Such glycol ether dialkyl ethers may be used alone or in combination of two or more, and smell less strongly, are of great safety and work in favor of working environments because of their high boiling point and low vapor pressure.

Exemplars of the polyoxyethylene (alkylene) glycol alkyl ether acetate represented by the general formula (2) are monomethyl ether acetate, monoethyl ether acetate, and monobutyl ether acetate of ethylene glycol; monomethyl ether acetate of propylene glycol; n-propyl ether acetate, and n-butyl ether acetate of diethylene glycol; and ethyl ether acetate, and n-butyl ether acetate of triethylene glycol, although the monobutyl ether acetate of ethylene glycol is most preferred.

The solvent may also contain the cyclic ester solvent represented by the general formula (3), and exemplars of that are γ-lactone having a five-membered ring structure, δ-lactone having a six-membered ring structure, and ε-lactone having a seven-membered ring structure; for instance, γ-butyrolacone, γ-valerolactone, γ-caprolactoner γ-caprilactone, γ-laurolactone, δ-valerolactone, δ-hexylactone, δ-heptalactone, and ε-caprolactone may be used alone or in admixture. In a preferable embodiment of the invention, the cyclic ester solvent is the γ-lactone having a five-membered ring, and in a more preferable embodiment of the invention, it is γ-butyrolacone, and γ-valerolactone. By use of the cyclic ester solvent, the quality of prints onto the polyvinyl chloride base materials is much more improved.

The content of the solvents represented by the general formulae (1) and/or (2) in all the solvents of the inventive ink is 5% by mass to 100% by mass, and preferably 10% by mass to 100% by mass.

Ink preparation involves uniform mixing of the above respective components thereby dispersing the pigments in the solvents. Typically, dispersion is implemented in a paint shaker using zirconia of φ0.8 mm for one hour, after which dispersion is kept on for three hours using zirconia beads of φ0.3 mm, thereby regulating ink viscosity to the range to be described later. Note here that the ink viscosity is measured by means of AMVn made by Anton Paar Co. Ltd.

What order the respective components are blended in, and how they are blended together is optional; for instance, they may be determined in consideration of the nature of the blends at the respective steps of the production process involved, ease of production, etc. For instance, one of the respective components alone may be blended independently, or they may be fed and blended in a bulk state to obtain their blend in one blend operation. Alternatively, two or three or more components may be blended together beforehand, and the ensuing blend may then be blended with the rest. Note here that when two or three or more components are blended together beforehand, they may be used in the whole amount or in some of the required amounts.

Preferably, the inventive oil ink has a viscosity at 20° C. regulated to 3 mPa·s to 15 mPa·s, and a surface tension regulated to 20 mN/m to 50 mN/m. If the surface tension is within that range, the wettability of the surface of an inkjet recording printer head can then be controlled, facilitating jetting of ink droplets and making it possible to control the wettability of the surface of the recording medium onto which prints are applied thereby enabling good printing.

The ink set of the invention may be applied to whatever recording media are, but it is when used with, for instance, plastic materials and especially a hard or soft polyvinyl chloride base material that the advantages of the invention are most produced. The polyvinyl chloride base material may be used in a film or sheet form. With the inventive ink set, it is possible to apply printing onto an untreated surface of the polyvinyl chloride base material that has so far have difficulty in printing with conventional oil ink compositions, dispensing with expensive recording media like a conventional recording medium having an ink-receiving layer. Of course, the inventive ink set may apply good printing on recording media surface treated with ink-receivable resin too.

EXAMPLES

Although the invention is now explained with reference to a number of inventive and comparative examples, it should be understood that they are given only for the purpose of letting those skilled in the art have a better understanding of the invention, and so do not intend to limit the invention. Unless otherwise stated, the "parts" in the inventive and comparative examples are given by mass.

It is here noted that for analysis, there were samples used that were obtained by the purification by hexane of only resins out of a resin solution. The weight-average molecular weight was measured by gel permeation chromatography with polystyrene used as a standard, using "HLC-8220GPC" made by Tosoh Corporation. The glass transition temperature (Tg) was measured on a differential scanning calorimeter "DSC-50" made by Shimadzu Co., Ltd. The average particle diameter (D50) was measured by a particle size analyzer "Microtrack UPA150" made by Nikkiso Co., Ltd.

(Synthesis of Polymer 1)

Two hundreds (200) grams of methyl methacrylate and 3.6 grams of t-butylperoxy-2-ethylhexanoate were added dropwise over 1.5 hours into 300 grams of diethylene glycol diethyl ether held at 100° C. After the completion of the dropwise addition, a two-hour reaction occurred at 100° C. followed by cooling, thereby obtaining a colorless, transparent solution of Polymer 1 of polymethyl methacrylate. Polymer 1 had a Tg of 105° C. and a weight-average molecular weight of 30,000. Upon analysis using a pyrolysis gas chromatograph mass analyzer, there was a molecule detected that had diethylene glycol diethyl ether bonded to methyl methacrylate.

(Synthesis of Polymer 2)

The synthesis process for Polymer 1 was repeated with the exception that ethylene glycol monobutyl ether acetate was used as the solution, thereby obtaining a colorless, transparent solution of Polymer 2 of polymethyl methacrylate. The Tg and weight-average molecular weight of Polymer 2 were 105° C. and 30,000, respectively.

(Preparation of Ink 1)

The solvent used had the following composition.

| | |
|---|---|
| Diethylene glycol diethyl ether | 60.0 parts by mass |
| Tetraethylene glycol dimethyl ether | 15.0 parts by mass |
| γ-Butyrolactone | 15.0 parts by mass |

Then, a part of the solvent having the above composition was added with 3.0 parts by mass of pigment yellow 150 (YELLOW PIGMENT E4GN-GT available from LANXESS) and 2.0 parts by mass of a dispersant "SOLSPERSE 32000" available from the Lubrizol Cooperation, and after a one-hour agitation at 3,000 rpm in a dissolver, pre-dispersion was carried out in a bead mill charged with zirconia beads (2 mm). The ensuing pigment particles had an average particle diameter of up to 5 µm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of Polymer 1 as a binder resin and the rest of the mixed solvent obtained as mentioned above were added to it to prepare Oil Ink 1 (having a viscosity of 4.3 mPa·s at 20° C.).

(Preparation of Ink 2)

The solvent used had the following composition.

| | |
|---|---|
| Diethylene glycol diethyl ether | 60.0 parts by mass |
| Tetraethylene glycol dimethyl ether | 15.0 parts by mass |
| γ-Valerorolactone | 15.0 parts by mass |

Then, a part of the solvent having the above composition was added with 3.0 parts by mass of pigment yellow 180 (NOVOPERM YELLOW P-HG available from Clariant) and 2.0 parts by mass of a dispersant "SOLSPERSE 32000" available from the Lubrizol Cooperation, and after a one-hour agitation at 3,000 rpm in a dissolver, pre-dispersion was carried out in a bead mill charged with zirconia beads (2 mm). The ensuing pigment particles had an average particle diameter of up to 5 µm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 4.0 parts by mass of Polymer 1 as a binder resin, 1.0 part by mass of a binder resin "VAGC" available from Dow Chemical Co. (hydroxyalkyl acrylate-modified vinyl chloride/vinyl acetate copolymer having a Tg of 65° C. and a weight-average molecular weight of 24,000) and the rest of the mixed solvent obtained as mentioned above were added to it to prepare Oil Ink 2 (having a viscosity of 4.7 mPa·s at 20° C.).

(Preparation of Ink 3)

The solvent used had the following composition.

| | |
|---|---|
| Diethylene glycol diethyl ether | 51.0 parts by mass |
| Tetraethylene glycol dimethyl ether | 25.0 parts by mass |
| γ-Butyrolactone | 15.0 parts by mass |

Then, a part of the solvent having the above composition was added with 3.0 parts by mass of pigment orange 64 (CROMOPHTAL® ORANGE GP available from Ciba Specialty Chemicals) and 2.0 parts by mass of a dispersant "Ajisper PB821" available from Ajinomoto Fine-Techno Co., Ltd., and after a one-hour agitation at 3,000 rpm in a dissolver, pre-dispersion was carried out in a bead mill charged with zirconia beads (2 mm). The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of Polymer 1 as a binder resin and the rest of the mixed solvent obtained as mentioned above were added to it to prepare Oil Ink 3 (having a viscosity of 4.3 mPa·s at 20° C.).

(Preparation of Ink 4)

The solvent used had the following composition.

| | |
|---|---|
| Diethylene glycol diethyl ether | 48.0 parts by mass |
| Tetraethylene glycol dimethyl ether | 18.0 parts by mass |
| Tetraethylene glycol monobutyl ether | 5.0 parts by mass |
| γ-Valerolactone | 20.0 parts by mass |

Then, a part of the solvent having the above composition was added with 3.0 parts by mass of pigment orange 71 (CROMOPHTAL® DPP ORANGE TR available from Ciba Specialty Chemicals) and 1.0 part by mass of a dispersant "SOLSPERSE 32000" available from the Lubrizol Corporation, and after a one-hour agitation at 3,000 rpm in a dissolver, pre-dispersion was carried out in a bead mill charged with zirconia beads (2 mm). The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 4.0 parts by mass of a binder resin "Paraloid B99N" available from Rohm and Haas (methyl methacrylate/butyl methacrylate copolymer having a Tg of 82° C. and a weight-average molecular weight of 15,000), 1.0 part by mass of a binder resin "VAGC" available from Dow Chemical Co. (hydroxyalkyl acrylate-modified vinyl chloride/vinyl acetate copolymer having a Tg of 65° C. and a weight-average molecular weight of 24,000) and the rest of the mixed solvent obtained as mentioned above were added to it to prepare Oil Ink 4 (having a viscosity of 4.0 mPa·s at 20° C.).

(Preparation of Ink 5)

The solvent used had the following composition.

| | |
|---|---|
| Diethylene glycol diethyl ether | 55.0 parts by mass |
| Tetraethylene glycol dimethyl ether | 20.0 parts by mass |
| γ-Butyrolactone | 10.0 parts by mass |
| γ-Valerolactone | 5.0 parts by mass |

Then, a part of the solvent having the above composition was added with 3.0 parts by mass of pigment red 254 (Ciba® IRGAPHOR® RED BT-CF available from Ciba Specialty Chemicals) and 2.0 part by mass of a dispersant "SOLSPERSE 32000" available from the Lubrizol Corporation, and after a one-hour agitation at 3,000 rpm in a dissolver, pre-dispersion was carried out in a bead mill charged with zirconia beads (2 mm). The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of a binder resin "Paraloid B60" available from Rohm and Haas (methyl methacrylate/butyl methacrylate copolymer having a Tg of 75° C. and a weight-average molecular weight of 50,000) and the rest of the mixed solvent obtained as mentioned above were added to it to prepare Oil Ink 5 (having a viscosity of 4.7 mPa·s at 20° C.).

(Preparation of Ink 6)

The solvent used had the following composition.

| | |
|---|---|
| Diethylene glycol diethyl ether | 48.0 parts by mass |
| Tetraethylene glycol dimethyl ether | 28.0 parts by mass |
| γ-Butyrolactone | 15.0 parts by mass |

Then, a part of the solvent having the above composition was added with 3.0 parts by mass of pigment red 122 (FASTGEN SUPER MAGENTA RG available from DIC) and 1.0 part by mass of a dispersant "Ajisper PB82" available from Ajinomoto Fine-Techno Co. Ltd., and after a one-hour agitation at 3,000 rpm in a dissolver, pre-dispersion was carried out in a bead mill charged with zirconia beads (2 mm). The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of Polymer 1 as a binder resin and the rest of the mixed solvent obtained as mentioned above were added to it to prepare Oil Ink 6 (having a viscosity of 4.2 mPa·s at 20° C.).

(Preparation of Ink 7)

The solvent used had the following composition.

| | |
|---|---|
| Diethylene glycol diethyl ether | 60.0 parts by mass |
| Tetraethylene glycol dimethyl ether | 10.0 parts by mass |
| γ-Butyrolactone | 20.0 parts by mass |

Then, a part of the solvent having the above composition was added with 3.0 parts by mass of pigment blue 15:4

(CYANIN BLUE CP-1 available from Dainichiseika Color & Chemicals Mfg. Co., Ltd.) and 2.0 part by mass of a dispersant "SOLSPERSE 32000" available from the Lubrizol Corporation), and after a one-hour agitation at 3,000 rpm in a dissolver, pre-dispersion was carried out in a bead mill charged with zirconia beads (2 mm). The ensuing pigment particles had an average particle diameter of up to 5 µm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of Polymer 1 as a binder resin and the rest of the mixed solvent obtained as mentioned above were added to it to prepare Oil Ink 7 (having a viscosity of 4.1 mPa·s at 20° C.).

(Preparation of Ink 8)

The solvent used had the following composition.

| Diethylene glycol diethyl ether | 52.0 parts by mass |
| Tetraethylene glycol dimethyl ether | 19.0 parts by mass |
| γ-Butyrolactone | 5.0 parts by mass |
| γ-Valerolactone | 15.0 parts by mass |

Then, a part of the solvent having the above composition was added with 3.0 parts by mass of pigment green 36 (CYANIN GREEN 5370 available from Dainichiseika Color & Chemicals Mfg. Co., Ltd.) and 1.0 part by mass of a dispersant "SOLSPERSE 32000" available from the Lubrizol Corporation, and after a one-hour agitation at 3,000 rpm in a dissolver, pre-dispersion was carried out in a bead mill charged with zirconia beads (2 mm). The ensuing pigment particles had an average particle diameter of up to 5 µm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of Polymer 1 as a binder resin and the rest of the mixed solvent obtained as mentioned above were added to it to prepare Oil Ink 8 (having a viscosity of 4.5 mPa·s at 20° C.).

(Preparation of Polymer 9)

The solvent used had the following composition.

| Diethylene glycol diethyl ether | 60.0 parts by mass |
| Tetraethylene glycol dimethyl ether | 10.0 parts by mass |
| Tetraethylene glycol monobutyl ether | 6.0 parts by mass |
| γ-Butyrolactone | 15.0 parts by mass |

Then, a part of the solvent having the above composition was added with 3.0 parts by mass of pigment green 7 (FASTGEN GREEN 5716 available from DXC) and 1.0 part by mass of a dispersant "Ajisper PB821" available from Ajinomoto Fine-Techno Co., Ltd., and after a one-hour agitation at 3,000 rpm in a dissolver, pre-dispersion was carried out in a bead mill charged with zirconia beads (2 mm). The ensuing pigment particles had an average particle diameter of up to 5 µm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of Polymer 1 as a binder resin and the rest of the mixed solvent obtained as mentioned above were added to it to prepare oil Ink 9 (having a viscosity of 4.4 mPa·s at 20° C.).

(Preparation of Ink 10)

The solvent used had the following composition.

| Diethylene glycol diethyl ether | 52.0 parts by mass |
| Tetraethylene glycol dimethyl ether | 25.0 parts by mass |
| γ-Butyrolactone | 15.0 parts by mass |

Then, a part of the solvent having the above composition was added with 3.0 parts by mass of pigment orange 64 (CROMOPHTAL® ORANGE GP available from Ciba Specialty Chemicals) and 1.0 parts by mass of a dispersant "Ajisper PB821" available from Ajinomoto Fine-Techno Co., Ltd., and after a one-hour agitation at 3,000 rpm in a dissolver, pre-dispersion was carried out in a bead mill charged with zirconia beads (2 mm). The ensuing pigment particles had an average particle diameter of up to 5 µm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of Polymer 1 as a binder resin, 1.0 part by mass of a binder resin "VAGC" available from now Chemical Co. (hydroxyalkyl acrylate-modified vinyl chloride/vinyl acetate copolymer having a Tg of 65° C. and a weight-average molecular weight of 24,000) and the rest of the mixed solvent obtained as mentioned above were added to it to prepare Oil Ink 10 (having a viscosity of 4.0 mPa·s at 20).

(Preparation of Ink 11)

The solvent used had the following composition.

| Diethylene glycol diethyl ether | 62.0 parts by mass |
| Tetraethylene glycol dimethyl ether | 10.0 parts by mass |
| γ-Butyrolactone | 18.0 parts by mass |

Then, a part of the solvent having the above composition was added with 3.0 parts by mass of pigment black 7 (CARBON BLACK MA-8 available from Mitsubishi Chemical) and 2.0 parts by mass of a dispersant "SOLSPERSE 32000" available from the Lubrizol Cooperation, and after a one-hour agitation at 3,000 rpm in a dissolver, pre-dispersion was carried out in a bead mill charged with zirconia beads (2 mm). The ensuing pigment particles had an average particle diameter of up to 5 µm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of Polymer 1 as a binder resin and the rest of the mixed solvent obtained as mentioned above were added to it to prepare Oil Ink 11 (having a viscosity of 4.4 mPa·s at 20° C.).

(Preparation of Ink 12)
The solvent used had the following composition.

| | |
|---|---|
| Diethylene glycol diethyl ether | 54.0 parts by mass |
| Tetraethylene glycol dimethyl ether | 19.0 parts by mass |
| γ-Butyrolactone | 5.0 parts by mass |
| γ-Valerolactone | 15.0 parts by mass |

Then, a part of the solvent having the above composition was added with 1.0 part by mass of pigment green 36 (CYANIN GREEN 5370 available from Dainichiseika Colors & Chemicals Mfg. Co., Ltd.) and 1.0 part by mass of a dispersant "SOLSPERSE 32000" available from the Lubrizol Corporation, and after a one-hour agitation at 3,000 rpm in a dissolver, pre-dispersion was carried out in a bead mill charged with zirconia beads (2 mm). The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of Polymer 1 as a binder resin and the rest of the mixed solvent obtained as mentioned above were added to it to prepare Oil Ink 12 (having a viscosity of 4.1 mPa·s at 20° C.).

(Preparation of Ink 13)
The solvent used had the following composition.

| | |
|---|---|
| Ethylene glycol monobutyl ether acetate | 67.0 parts by mass |
| γ-Butyrolactone | 20.0 parts by mass |

Then, a part of the solvent having the above composition was added with 3.0 parts by mass of pigment yellow 180 (NOVOPERM YELLOW P-HG available from Clariant) and 2.0 parts by mass of a dispersant "SOLSPERSE 32000" available from the Lubrizol Corporation, and after a one-hour agitation at 3,000 rpm in a dissolver, pre-dispersion was carried out in a bead mill charged with zirconia beads (2 mm). The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 8.0 parts by mass of Polymer 2 as a binder resin and the rest of the mixed solvent obtained as mentioned above were added to it to prepare Oil Ink 13 (having a viscosity of 8.2 mPa·s at 20° C.).

(Preparation of Ink 14)
The solvent used had the following composition.

| | |
|---|---|
| Ethylene glycol monobutyl ether acetate | 68.0 parts by mass |
| γ-Butyrolactone | 20.0 parts by mass |

Then, a part of the solvent having the above composition was added with 3.0 parts by mass of pigment orange 64 (CROMOPHTAL® ORANGE GP available from Ciba Specialty Chemicals) and 1.0 part by mass of a dispersant "SOLSPERSE 32000" available from the Lubrizol Corporation, and after a one-hour agitation at 3,000 rpm in a dissolver, pre-dispersion was carried out in a bead mill charged with zirconia beads (2 mm). The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 8.0 parts by mass of Polymer 2 as a binder resin and the rest of the mixed solvent obtained as mentioned above were added to it to prepare Oil Ink 14 (having a viscosity of 8.0 mPa·s at 20%).

(Preparation of Ink 15)
The solvent used had the following composition.

| | |
|---|---|
| Diethylene glycol diethyl ether | 20.0 parts by mass |
| Ethylene glycol monobutyl ether acetate | 46.0 parts by mass |
| γ-Butyrolactone | 15.0 parts by mass |
| γ-Valerolactone | 5.0 part by mass |

Then, a part of the solvent having the above composition was added with 3.0 parts by mass of pigment red 122 (FASTGEN SUPER MAGENTA RG available from DIC) and 2.0 parts by mass of a dispersant "SOLSPERSE 32000" available from the Lubrizol Corporation, and after a one-hour agitation at 3,000 rpm in a dissolver, pre-dispersion was carried out in a bead mill charged with zirconia beads (2 mm). The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 8.0 parts by mass of Polymer 2 as a binder resin, 1.0 part by mass of a binder resin "VAGC" available from Dow Chemical Co. (hydroxyalkyl acrylate-modified vinyl chloride/vinyl acerate polymer having a Tg of 65° C. and a weight-average molecular weight of 24,000) and the rest of the mixed solvent obtained as mentioned above were added to it to prepare Oil Ink 15 (having a viscosity of 9.3 mPa·s at 20° C.).

(Preparation of Ink 16)
The solvent used had the following composition.

| | |
|---|---|
| Ethylene glycol monobutyl ether acerate | 57.0 parts by mass |
| Propylene glycol monobutyl ether acetate | 10.0 parts by mass |
| γ-Butyrolactone | 20.0 parts by mass |

Then, a part of the solvent having the above composition was added with 3.0 parts by mass of pigment blue 15:4 (CYANIN BLUE CP-1 available from Dainichiseika Color & Chemicals Mfg. Co., Ltd.) and 2.0 part by mass of a dispersant "SOLSPERSE 32000" available from the Lubrizol Corporation), and after a one-hour agitation at 3,000 rpm in a dissolver, pre-dispersion was carried out in a bead mill charged with zirconia beads (2 mm). The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 8.0 parts by mass of a binder resin "Paraloid B60"

available from Rohm and Hass (methyl methacrylate/butyl methacrylate copolymer having a Tg of 75° C. and a weight-average molecular weight of 50,000) and the rest of the mixed solvent obtained as mentioned above were added to it to prepare Oil Ink 16 (having a viscosity of 9.5 mPa·s at 20° C.).

(Preparation of Ink 17)

The solvent used had the following composition.

| | |
|---|---|
| Ethylene glycol monobutyl ether acetate | 67.0 parts by mass |
| γ-Butyrolactone | 20.0 parts by mass |

Then, a part of the solvent having the above composition was added with 4.0 parts by mass of pigment green 36 (CYANIN GREEN 5370 available from Dainichiseika Color & Chemicals Mfg. Co., Ltd.) and 1.0 part by mass of a dispersant "Ajisper PB821" available from the Ajinomoto Fine-Techno Co., Ltd., and after a one-hour agitation at 3,000 rpm in a dissolver, pre-dispersion was carried out in a bead mill charged with zirconia beads (2 mm). The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 7.0 parts by mass of a binder resin "Paraloid B60" available from Rohm and Hass (methyl methacrylate/butyl methacrylate copolymer having a Tg of 75° C. and a weight-average molecular weight of 24,000), 1.0 part by mass of a binder resin "VAGC" available from Dow Chemical Co. (hydroxyalkyl acrylate-modified vinyl chloride/vinyl acetate copolymer having a Tg of 65° C. and a weight-average molecular weight of 24,000) and the rest of the mixed solvent obtained as mentioned above were added to it to prepare Oil Ink 17 (having a viscosity of 10.5 mPa·s at 20° C.).

(Preparation of Polymer 18)

The solvent used had the following composition.

| | |
|---|---|
| Ethylene glycol monobutyl ether acetate | 57.0 parts by mass |
| Propylene glycol monomethyl ether acetate | 10.0 parts by mass |
| γ-Butyrolactone | 20.0 parts by mass |

Then, a part of the solvent having the above composition was added with 3.0 parts by mass of pigment black 7 (CARBON BLACK MA-8 available from Mitsubishi Chemical) and 2.0 parts by mass of a dispersant "SOLSPERSE 32000" available from the Lubrizol Corporation, and after a one-hour agitation at 3,000 rpm in a dissolver, pre-dispersion was carried out in a bead mill charged with zirconia beads (2 mm). The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 8.0 parts by mass of a binder resin "Paraloid B99N" available from Rohm and Haas (methyl methacrylate/butyl methacrylate copolymer having a Tg of 82° C. and a weight-average molecular weight of 15,000) and the rest of the mixed solvent obtained as mentioned above were added to it to prepare Oil Ink 18 (having a viscosity of 7.6 mPa·s at 20° C.).

(First Oil Ink Set)

The oil inks set out in the following Table 1 were combined into the ink sets of Examples 1-6, Comparative Example A, and Comparative Examples 1 and 2. The first oil ink set is now explained with reference to Examples 1-6, Comparative Example A, and Comparative Examples 1 and 2.

TABLE 1

| | $1^{st}$ Ink | $2^{nd}$ Ink | $3^{rd}$ Ink | Cyan Ink | Black Ink |
|---|---|---|---|---|---|
| Comp. Ex. A | Ink 6 | Not used | Ink 1 | Not used | Ink 11 |
| Ex. 1 | Ink 6 | Ink 3 | Ink 1 | Not used | Ink 11 |
| Ex. 2 | Ink 6 | Ink 4 | Ink 1 | Not used | Not used |
| Ex. 3 | Ink 6 | Ink 5 | Ink 1 | Ink 7 | Not used |
| Comp. Ex. 1 | Ink 6 | Ink 10 | Ink 1 | Not used | Not used |
| Ex. 4 | Ink 6 | Ink 3 | Ink 2 | Ink 7 | Ink 11 |
| Ex. 5 | Ink 15 | Ink 14 | Ink 13 | Not used | Not used |
| Ex. 6 | Ink 6 | Ink 5 | Ink 2 | Not used | Not used |
| Comp. Ex. 2 | Ink 6 | Ink 10 | Ink 2 | Ink 7 | Ink 11 |

Each of the oil ink sets obtained as mentioned above was loaded in "Four-Color Inkjet Printer MJ8000C" available from Seiko Epson Co., Ltd., and prints were applied onto a soft polyvinyl chloride (LAG Mount P-223RW available from Lintec Co., Ltd.) to measure the reflectivity spectra, L* value, a* value, b* value and hue angle H° of the printed ink by means of "GRETAG Spedtrolino" (D65 light source, and a field angle of 2° available from Gretag Co., Ltd.

FIG. 1 is a diagram for the reflectivity spectra of the first (thin line), the second (dotted line), and the third oil ink (thick line) in the oil ink set of Example 1 as measured in the wavelength range of 400 nm to 700 nm. FIG. 2 to 6 are diagrams for the reflectivity spectra of the oil inks in Examples 2 to 6, and FIGS. 7 and 8 are diagrams for the reflectivity spectra of the oil inks in Comparative Examples 1 and 2, respectively, as measured in the wavelength range of 400 nm to 700 nm.

When the first, the second, and the third oil ink is magenta, orange, and yellow, respectively, the first oil ink set of the invention has reflection characteristics such that the first, the second, and the third oil ink has a wavelength region where the reflectivity changes from 80% to 5% on the recording medium in the wavelength range of 400 nm to 800 nm, as shown in FIGS. 1 to 6. More specifically, the first oil ink has a reflectivity of 80% at about 630 nm wavelength and a reflectivity of 5% at about 580 nm wavelength: it is seen that the wavelength region for the first oil ink where the reflectivity on the recording medium changes 80% to 5% is between about 580 nm and about 630 nm. And in this wavelength range of about 580 nm to about 630 nm, the reflectivity of the second oil ink is continuously higher than that of the first oil ink.

The wavelength region for the second oil ink where the reflectivity changes from 80% to 5% is between about 550 nm and about 580 nm, and in this wavelength region, the reflectivity of the third oil ink is continuously higher than that of the second oil ink. And it can be seen from FIGS. 7 and 8 that even with the same pigment combinations as in each example, there is none of the inventive reflectivity spectral relations in Comparative Examples 1 and 2.

Figure 9:
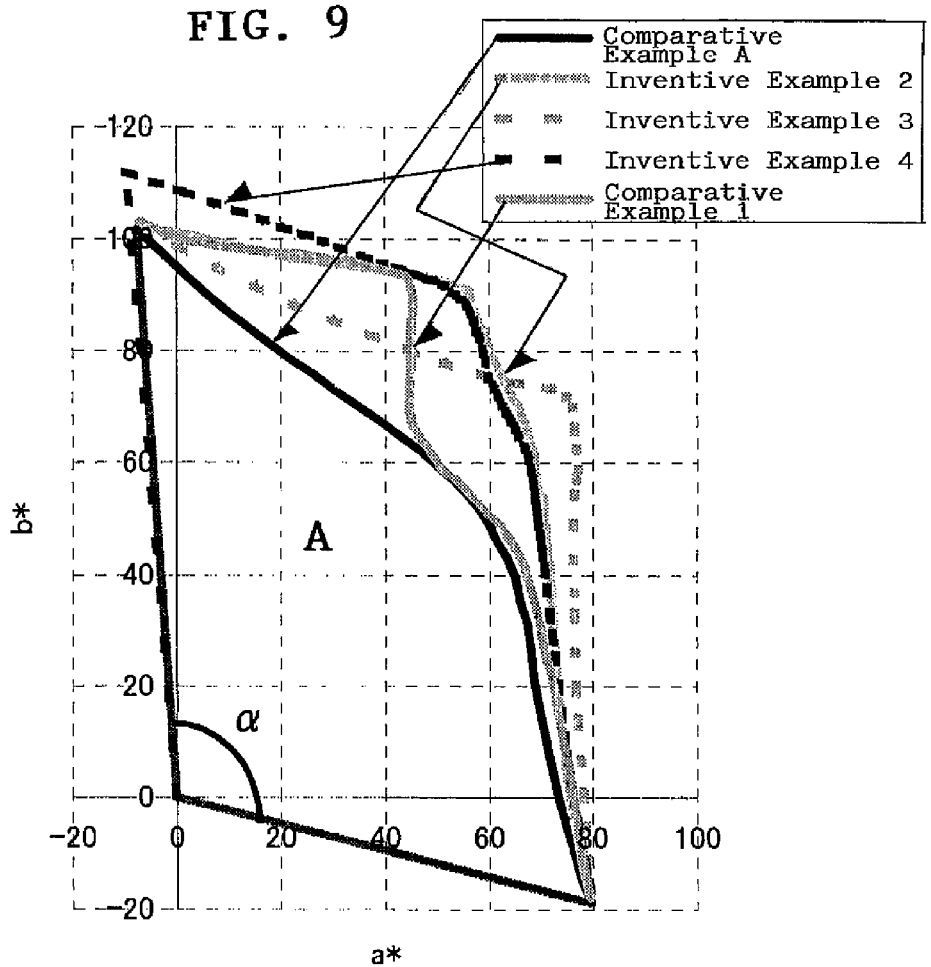
FIG. 9 is illustrative of a color reproduction area for the first oil ink set of the invention in terms of the L*a*b* chromaticity diagram.

FIG. 9 is illustrative of the color reproduction area achieved by each of Examples 2-4, and Comparative Examples A and 1 in terms of the L*a*b* chromaticity diagram. Tabulated in Table 2, given just below, are the L*a*b* values and hue angles of prints obtained through Ink 1, Ink 2, Ink 3, Ink 4, Ink 5, Ink 6, Ink 7 and Ink 10 used in Examples 2-4 and Comparative Examples A and 1.

TABLE 2

| Ink (Pigment) | L* | a* | b* | Hue Angle H° |
|---|---|---|---|---|
| Ink 1 (PY150) | 87.1 | −6.8 | 101.3 | 93.8 |
| Ink 2 (PY180) | 91.7 | −9.6 | 109.0 | 95.1 |
| Ink 3 (PO64) | 65.9 | 57.4 | 75.8 | 52.9 |
| Ink 4 (PO71) | 65.2 | 55.8 | 85.8 | 56.9 |
| Ink 5 (PR254) | 47.3 | 77.0 | 60.0 | 37.9 |
| Ink 6 (PR122) | 44.3 | 79.9 | −18.5 | 347.0 |
| Ink 7 (PB15:4) | 42.4 | −12.8 | −58.0 | 257.5 |
| Ink 10 (PO64) | 72.5 | 45.4 | 66.3 | 55.6 |

Referring here to FIG. 9, the color reproduction area is indicated by a fan-form area A delimited by a straight line connecting the a*b* coordinates (point a) for the first oil ink (magenta ink) with the origin and a straight line connecting the a*b* coordinates (point b) for the third oil ink (yellow ink) with the origin, with an angle (hue angle (α)) made between two such straight lines and on a side containing the a*b* coordinates for the second ink.

Tabulated in Table 3, given just below, are the found values of the area A in the respective ink sets of Examples 1 to 6 and Comparative Examples 1 and 2, its ratio (%) relative to the area in Comparative Example A and estimation of the ability to reproduce colors. In the estimation of the ability to reproduce colors, rank A indicates that the area ratio relative to that in Comparative Example A is greater than 120%: the ability to reproduce colors is high, whereas rank B indicates that although the ability to reproduce colors is good, yet it is inferior to that of the invention.

TABLE 3

| | Area A | Area Ratio | Estimation |
|---|---|---|---|
| Comp. Ex. A | 5825 | — | — |
| Ex. 1 | 7629 | 131% | A |
| Ex. 2 | 7561 | 130% | A |
| Ex. 3 | 7567 | 130% | A |
| Comp. Ex. 1 | 6485 | 111% | B |
| Ex. 4 | 7937 | 136% | A |
| Ex. 5 | 8026 | 138% | A |
| Ex. 6 | 7842 | 135% | A |
| Comp. Ex. 2 | 6742 | 116% | B |

(Second Oil Ink Set)

The oil inks set out in the following Table 4 were combined into the ink sets of Examples 7-11, Comparative Example B, and Comparative Examples 3 and 4. The second oil ink set is now explained with reference to Examples 7-11, Comparative Example B, and Comparative Examples 3 and 4.

TABLE 4

| | 4th Ink | 5th Ink | 6th Ink | Magenta Ink | Black Ink |
|---|---|---|---|---|---|
| Comp. Ex. B | Ink 7 | Not used | Ink 1 | Not used | Ink 11 |
| Ex. 7 | Ink 7 | Ink 8 | Ink 1 | Not used | Not used |
| Ex. 8 | Ink 7 | Ink 9 | Ink 1 | Not used | Not used |
| Comp. Ex. 3 | Ink 7 | Ink 12 | Ink 1 | Not used | Not used |
| Ex. 9 | Ink 7 | Ink 8 | Ink 2 | Not used | Ink 11 |
| Ex. 10 | Ink 7 | Ink 9 | Ink 2 | Ink 6 | Not used |
| Ex. 11 | Ink 16 | Ink 17 | Ink 13 | Ink 15 | Ink 18 |
| Comp. Ex. 4 | Ink 7 | Ink 12 | Ink 2 | Not used | Not used |

As in the first oil ink set, the reflectivity spectral curves of the respective oil inks in the oil ink combinations are shown in the same diagrams. FIG. 10 is a diagram for the reflectivity spectra of the fourth (thin line), the fifth (dotted line), and the sixth oil ink (thick line) in the oil ink set of Example 7 as measured in the wavelength range of 400 nm to 700 nm. FIG. 11 to 14 are diagrams for the reflectivity spectra of the oil inks in Examples 8 to 11, and FIGS. 15 and 16 are diagrams for the reflectivity spectra of the oil inks in Comparative Examples 3 and 4, respectively, as measured in the wavelength range of 400 nm to 700 nm.

When the fourth, the fifth, and the sixth oil ink is cyan, green, and yellow, respectively, the second oil ink set of the invention has reflection characteristics such that as the wavelength at which the reflectivity of each oil ink becomes 5% on the recording medium in the wavelength range of 400 nm to 700 nm, the sixth oil ink has one wavelength: about 480 nm (C), the fourth oil ink has one wavelength: about 550 nm (D), and the fifth oil ink has two wavelengths in which the shorter one is about 400 nm (E) and the longer one is about 650 nm (F), as shown in FIGS. 10 to 14. Note here that when the fourth oil ink has two wavelengths, the longer one is presumed to be D. And the reflectivity of the sixth oil ink is continuously less than 5% in a wavelength range shorter than the wavelength C, the reflectivity of the fourth oil ink is continuously less than 5% in a wavelength range longer than the wavelength D, and there is the relation: E<C<D<F satisfied between the wavelengths C, D, E and F. It is then seen from FIGS. 15 and 16 that even with the same pigment combinations as in the respective examples, in Comparative Examples 3 and 4, there is none of the wavelength region in which the reflectivity of the fourth oil ink becomes 5%, and there is none of the reflectivity spectral relation for the second oil ink set.

Figure 17:
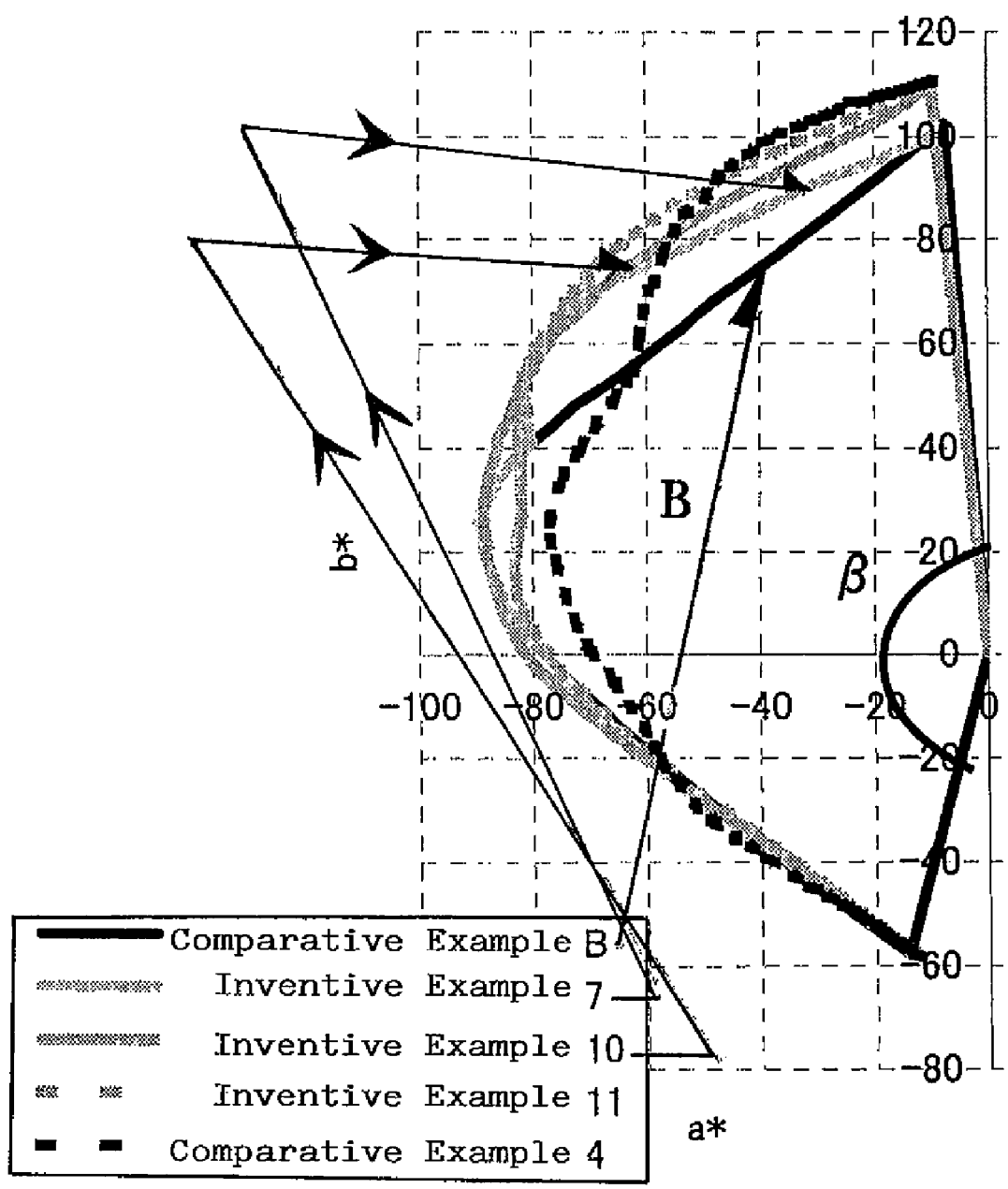
FIG. 17 is illustrative of a color reproduction area for the second oil ink set of the invention in terms of the L*a*b* chromaticity diagram.

FIG. 17 is illustrative of the color reproduction area achieved by each of Examples 7 and 10-11, and Comparative Examples B and 4 in terms of the L*a*b* chromaticity diagram. Tabulated in Table 5, given just below, are the L*a*b* values and hue angle values of prints obtained through Ink 1, Ink 2, Ink 6, Ink 7, Ink 8, Ink 9, Ink 12, Ink 13, Ink 15, Ink 16 and Ink 17 used in Examples 7 and 10-11 and Comparative Examples B and 4. Note here that those of Inks 1, 2, 6 and 7 are left out because of being given in Table 2.

TABLE 5

| Ink (Pigment) | L* | a* | b* | Hue Angle H° |
|---|---|---|---|---|
| Ink 8 (PG36) | 70.7 | −77.1 | 28.9 | 159.4 |
| Ink 9 (PG7) | 55.1 | −84.9 | 6.8 | 175.4 |
| Ink 12 (PG36) | 82.0 | −54.0 | 18.1 | 161.5 |
| Ink 13 (PY180) | 91.7 | −9.6 | 109.0 | 95.1 |
| Ink 15 (PR122) | 44.3 | 79.9 | −18.5 | 347.0 |
| Ink 16 (PB15:4) | 42.4 | −12.8 | −58.0 | 257.5 |
| Ink 17 (PG36) | 67.0 | −80.9 | 31.3 | 158.8 |

Referring here to FIG. 17, the color reproduction area is indicated by a fan-form area (B) delimited by a straight line connecting the a*b* coordinates for the fourth oil ink (cyan ink) with the origin and a straight line connecting the a*b* coordinates for the sixth oil ink (yellow ink) with the origin, with an angle (hue angle (β)) made between two such straight lines and on a side containing the a*b* coordinates for the second ink.

Tabulated in Table 6, given just below, are the found values of the area (B) in the respective ink sets of Examples 7 to 11 and Comparative Examples B, 3 and 4, its ratio (%) relative to the area in Comparative Example B and estimation of the ability to reproduce colors. In the estimation of the ability to reproduce colors, rank A indicates that the area ratio relative to that in Comparative Example B is greater than 110%: the ability to reproduce colors is high, rank B indicates that the area ratio is from 105% to below 110%: the ability to reproduce colors is good, and rank C indicates that the area ratio is from 100% to below 105%: the improvement in the ability to reproduce colors is inferior.

TABLE 5

|  | Area A | Area Ratio | Estimation |
|---|---|---|---|
| Comp. Ex. B | 8110 | — | — |
| Ex. 7 | 8987 | 111% | A |
| Ex. 8 | 8890 | 110% | A |
| Comp. Ex. 3 | 8715 | 107% | B |
| Ex. 9 | 9075 | 112% | A |
| Ex. 10 | 9321 | 115% | A |
| Ex. 11 | 9230 | 114% | A |
| Comp. Ex. 4 | 8439 | 104% | C |

(Third Oil Ink Set)

As set out in Table 7, given just below, the first and second oil ink sets are combined together into ink sets comprising combinations 2 to 12 that are each the third ink set.

TABLE 7

| Combination |  | 1st Ink | 2nd Ink |  |
|---|---|---|---|---|
| 1 | Comp. Ex. A | Comp. Ex. B | Ink 6 | Not used |
| 2 | Ex. 1 | Ex. 7 | Ink 6 | Ink 3 |
| 3 | Ex. 1 | Ex. 8 | Ink 6 | Ink 3 |
| 4 | Ex. 2 | Ex. 7 | Ink 6 | Ink 4 |
| 5 | Ex. 2 | Ex. 8 | Ink 6 | Ink 4 |
| 6 | Ex. 3 | Ex. 7 | Ink 6 | Ink 5 |
| 7 | Ex. 3 | Ex. 8 | Ink 6 | Ink 5 |
| 8 | Ex. 4 | Ex. 9 | Ink 6 | Ink 3 |
| 9 | Ex. 4 | Ex. 10 | Ink 6 | Ink 3 |
| 10 | Ex. 5 | Ex. 11 | Ink 15 | Ink 14 |
| 11 | Ex. 6 | Ex. 9 | Ink 6 | Ink 5 |
| 12 | Ex. 6 | Ex. 10 | Ink 6 | Ink 5 |
| 13 | Comp. Ex. 1 | Comp. Ex. 3 | Ink 6 | Ink 10 |

| Combination | 3rd Ink | 4th Ink | 5th Ink | Black Ink |
|---|---|---|---|---|
| 1 | Ink 1 | Ink 7 | Not used | Ink 11 |
| 2 | Ink 1 | Ink 7 | Ink 8 | Ink 11 |
| 3 | Ink 1 | Ink 7 | Ink 9 | Ink 11 |
| 4 | Ink 1 | Ink 7 | Ink 8 | Ink 11 |
| 5 | Ink 1 | Ink 7 | Ink 9 | Ink 11 |
| 6 | Ink 1 | Ink 7 | Ink 8 | Ink 11 |
| 7 | Ink 1 | Ink 7 | Ink 9 | Ink 11 |
| 8 | Ink 2 | Ink 7 | Ink 8 | Ink 11 |
| 9 | Ink 2 | Ink 7 | Ink 9 | Ink 11 |
| 10 | Ink 13 | Ink 16 | Ink 17 | Ink 18 |
| 11 | Ink 2 | Ink 7 | Ink 8 | Ink 11 |
| 12 | Ink 2 | Ink 7 | Ink 9 | Ink 11 |
| 13 | Ink 1 | Ink 7 | Ink 12 | Ink 11 |

Figure 18:
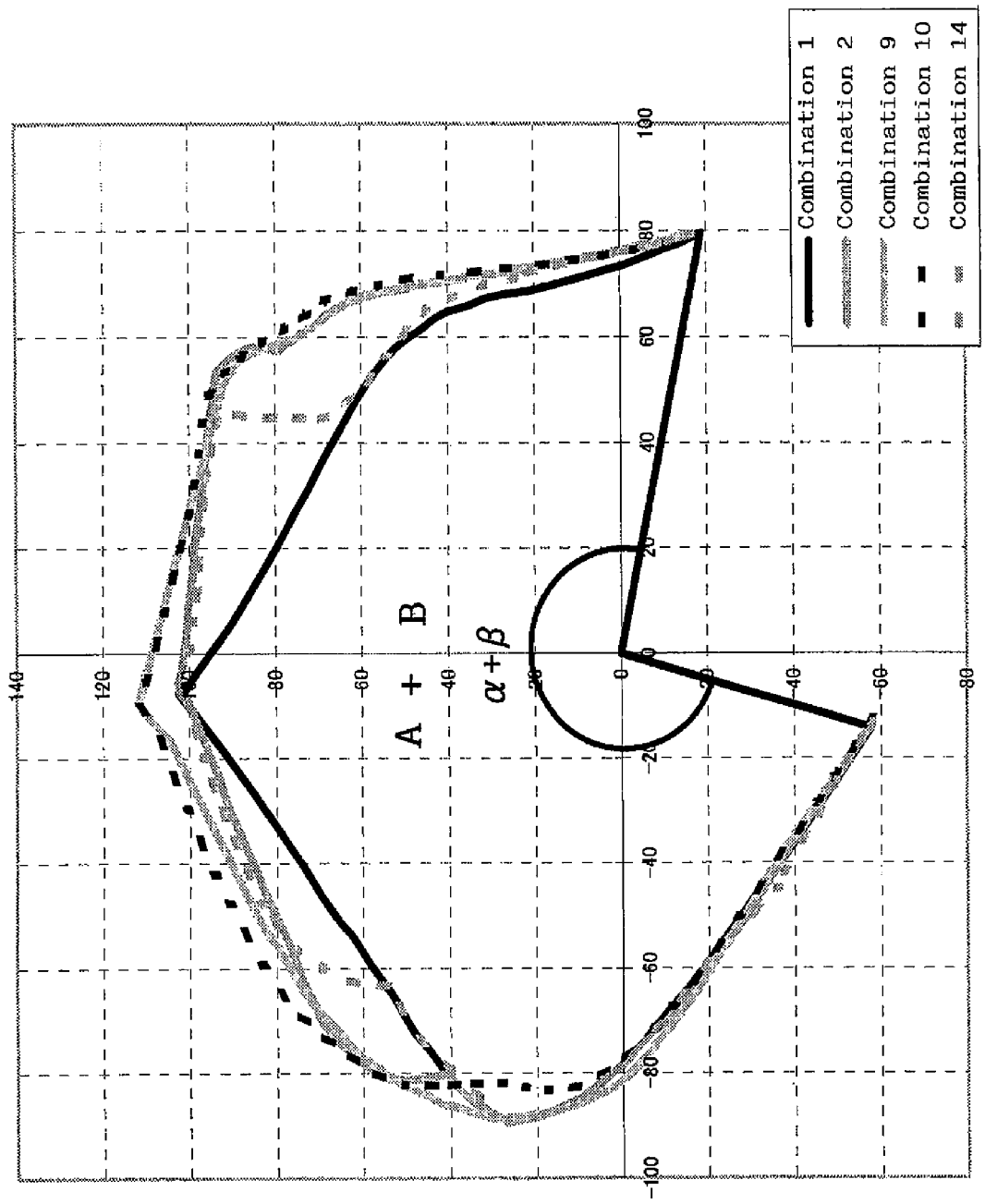
FIG. 18 is illustrative of a color reproduction area for the third oil ink set of the invention in terms of the L*a*b* chromaticity diagram.

In FIG. 18, the color reproduction area for Combination 1 (Comparative Example A for YM, and Comparative Example B for YG), Combination 2 (Example 1 for YM and Example 7 for YG), Combination 9 (Example 4 for YM and Example 11 for YG), Combination 10 (Example 5 for YM and Example 11 for YG), and Combination 13 (Comparative Example 1 for YM and Comparative Example 3 for YG) is illustrated in terms of the L*a*b* chromaticity diagram.

Referring here to FIG. 18, the ability to reproduce colors is represented by the found area (A+B) of the fan-form area delimited by a straight line connecting the a*b* coordinates for the first oil ink with the origin and a straight line connecting the a*b* coordinates for the fourth oil ink with the origin, with an angle (hue angle (α+β)) made between two such straight lines and on a side containing the a*b* coordinates for the third (sixth) ink.

In the color reproduction area for YMC, except that for MC, in the third oil ink set of the invention, the area (A+B) of Combination 2 is found by calculation to be 16615, and its area ratio to the area (13935) of Combination 1 is 119%, whereas the area (A+B) of Combination 13 is found by calculation to be 15200, and its area ratio is 109%: Combination 2 in the third oil ink set of the invention is more improved in terms of the color reproduction area.

Set out in Table 8, given just below, are the found value and area ratio relative to that of Combination 1 of the area (A+B) of each ink set. In the estimation of the ability to reproduce colors, rank A indicates that the area ratio relative to the area of Combination 1 is greater than 115%: the ability to reproduce colors is high, and rank B indicates that the area ratio is from 100% to below 115%: the ability to reproduce colors is good.

TABLE 8

| Combination | | Area A | Area B | Total Area | Area Ratio | Estimation |
|---|---|---|---|---|---|---|
| 1 | Comp. Ex. A | Comp. Ex. B | 5825 | 8110 | 13935 | — | — |
| 2 | Ex. 1 | Ex. 7 | 7629 | 8987 | 16615 | 119% | A |
| 3 | Ex. 1 | Ex. 8 | 7629 | 8890 | 16519 | 119% | A |
| 4 | Ex. 2 | Ex. 7 | 7561 | 8987 | 16548 | 119% | A |
| 5 | Ex. 2 | Ex. 8 | 7561 | 8890 | 16451 | 118% | A |
| 6 | Ex. 3 | Ex. 7 | 7567 | 8987 | 16554 | 119% | A |
| 7 | Ex. 3 | Ex. 8 | 7567 | 8890 | 16457 | 118% | A |
| 8 | Ex. 4 | Ex. 9 | 7937 | 9075 | 17012 | 122% | A |
| 9 | Ex. 4 | Ex. 10 | 7937 | 9321 | 17258 | 124% | A |
| 10 | Ex. 5 | Ex. 11 | 8026 | 9230 | 17256 | 124% | A |
| 11 | Ex. 6 | Ex. 9 | 7842 | 9075 | 16917 | 121% | A |
| 12 | Ex. 6 | Ex. 10 | 7842 | 9321 | 17163 | 123% | A |
| 13 | Comp. Ex. 1 | Comp. Ex. 3 | 6485 | 8715 | 15200 | 109% | B |

From the results of estimation, it is found that with the oil ink sets of the invention, images having high color reproduction capabilities and high color saturation could be obtained.

APPLICABILITY TO THE INDUSTRY

The present invention provides an inkjet recording oil ink set that makes it possible to obtain images having high color reproduction capabilities and high color saturation.

What we claim is:

1. An oil ink set in which at least a first oil ink, a second oil ink and a third oil ink each contain a coloring material and are combined together, characterized in that said first, said second, and said third oil ink has a wavelength region in which its reflectivity on a recording medium changes from 80% to 5% in a wavelength range of 400 nm to 700 nm; in the wavelength region where the reflectivity of said first oil ink changes from 80% to 5%, the reflectivity of said second oil ink is continuously higher than that of said first oil ink, and in the wavelength region where the reflectivity of said second oil ink changes from 80% to 5%, the reflectivity of said third oil ink is continuously higher than that of said second oil ink; wherein said first oil ink is pigment red 122, said second oil ink is an orange ink or red ink selected from the group consisting of pigment orange 64, pigment orange 71 and pigment red 254, said third oil ink is a yellow ink selected from the group consisting of pigment yellow 150 and pigment yellow 180; the coloring materials in said first, said second and said third oil ink are all different; and each of said oil inks contains at least 30% by mass of a polyoxyethylene glycol dialkyl ether represented by the following general formula (1) and/or a polyoxyethylene (alkylene) glycol alkyl ether acetate represented by the following general formula (2), and a (meth) acrylic resin as a fixing resin $$X_1-(OC_2H_4)_n-OX_2 \quad \text{General Formula (1)}$$

wherein $X_1$ and $X_2$ are each an alkyl group having 1 to 3 carbon atoms and may be identical or different, and n stands for an integer of 2, 3, and 4

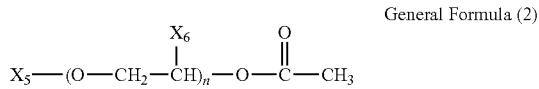

General Formula (2)

wherein $X_5$ is an alkyl group, $X_6$ is a hydrogen atom or an alkyl group, and n stands for an integer of 1, 2, 3, and 4.

2. The oil ink set according to claim 1, characterized in that said first, said second, and said third oil ink has a hue angle in a range of 0° to 110° or 330° to 360° as expressed in terms of CIELAB.

3. The oil ink set according to claim 1, characterized by further containing a cyan ink and/or a black ink.

4. An oil ink set, characterized by comprising an oil ink set in which at least a first oil ink, a second oil ink and a third oil ink each contain a coloring material and are combined together, and said first, said second, and said third oil ink have a wavelength area wherein a reflectivity of each oil ink on a recording medium changes from 80% to 5% in a wavelength range of 400 to 700 nm, wherein in the wavelength region where the reflectivity of said first oil ink changes from 80% to 5%, the reflectivity of said second oil ink is continuously higher than that of said first oil ink, and in the wavelength region wherein the reflectivity of said second oil ink changes from 80% to 5%, the reflectivity of said third oil ink is continuously higher than that of said second oil ink, wherein said first oil ink is pigment red 122, said second oil ink is an orange ink or red ink selected from the group consisting of pigment orange 64, pigment orange 71 and pigment red 254, wherein said third oil ink is a yellow ink selected from the group consisting of pigment yellow 150 and pigment yellow 180, and the coloring materials in said first, said second and said third oil ink are all different; and an oil ink set in which at least a fourth oil ink, a fifth oil ink and a sixth oil ink each contain a coloring material and are combined together, wherein as a wavelength where a reflectivity of each oil ink on a recording medium becomes 5% in a wavelength range of 400 nm to 700 nm, said sixth oil ink has one wavelength C, said fourth oil ink has one or two wavelengths: wherein there is one wavelength, that wavelength is represented by D and wherein there are two wavelengths, a longer one is represented by D, and said fifth oil ink has two wavelengths wherein a shorter one is represented by E and a longer one is represented by F, wherein the reflectivity of said sixth oil ink is continuously 5% or lower in a wavelength range shorter than the wavelength C, the reflectivity of said fourth oil ink is continuously 5% or lower in a wavelength range longer than the wavelength D, and the wavelengths C, D, E and F satisfy a relation: E<C<D<F, said fourth oil ink is pigment blue 15:4, said fifth oil ink is a green ink selected from the group consisting of pigment green 7 and pigment green 36, said sixth oil ink is a yellow ink selected from the group consisting of pigment yellow 150 and pigment yellow 180, and wherein the same oil ink is used for said third and said sixth oil ink, and five oil inks at least comprising said first, said second, said third, said fourth and said fifth oil ink are combined together, and each of said oil inks contains at least 30% by mass of a polyoxyethylene glycol dialkyl ether represented by the following general formula (1) and/or a polyoxyethylene (alkylene) glycol alkyl ether acetate represented by the following general formula (2), and a (meth) acrylic resin as a fixing resin, $$X_1-(OC_2H_4)_n-OX_2 \quad \text{General Formula (1)}$$

wherein $X_1$ and $X_2$ are each an alkyl group having 1 to 3 carbon atoms and may be identical or different, and n stands for an integer of 2, 3, and 4,

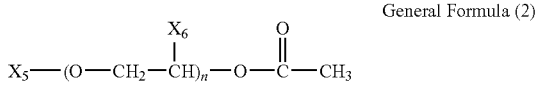

General Formula (2)

wherein $X_5$ is an alkyl group, $X_6$ is a hydrogen atom or an alkyl group, and n stands for an integer of 1, 2, 3, and 4.

5. The oil ink set according to claim 4, characterized in that said first, said second, and said third oil ink have a hue angle in a range of 0° to 110° or 330° to 360°, and said fourth, said fifth, and said sixth oil ink have a hue angle in a range of 80° to 270° as expressed in terms of CIELAB.

6. The oil ink set according to claim 4, characterized by further containing a black ink.

7. The oil ink set according to claim 1, characterized in that each oil ink contains at least 50% by mass of a mixed solvent containing 0.02 to 4 parts by mass of a cyclic ester solvent represented by the following general formula (3) per 1 part by mass of the solvents represented by the general formula (1) anchor (2):

General Formula (3)

wherein $X_3$ and $X_4$ are each a hydrogen atom or an alkyl or alkenyl group having 1 to 7 carbon atoms and may be identical or different, and m stands for an integer of 1, 2 and 3.

8. The oil ink set according to claim 7, characterized in that said cyclic ester solvent is a y-lactone solvent.

9. The oil ink set according to claim 8, characterized in that said y-lactone solvent is y-valerolactone or y-butyrolactone.

10. The oil ink set according to claim 4, characterized in that said (meth) acrylic resin is a homopolymer of methyl (meth)acrylate or a copolymer of methyl (meth)acrylate and butyl (meth)acrylate.

11. The oil ink set according to claim 1, characterized in that said (meth) acrylic resin contains a (meth) acrylic resin obtained by solution polymerization using a radical polymerization initiator in a polyoxyethylene glycol dialkyl ether solvent represented by said general formula (1) and/or a polyoxyethylene (alkylene) glycol alkyl ether acetate solvent represented by said general formula (2).

12. The oil ink set according to claim 1, characterized in that said (meth) acrylic resin has a glass transition temperature (Tg) of 70° C. or higher.

13. The oil ink set according to claim 1, characterized in that said (meth) acrylic resin has a weight-average molecular weight of 8,000 to 100,000.

14. The oil ink set according to claim 1, characterized in that as said fixing resin, the (meth) acrylic resin is used in combination with a vinyl chloride/vinyl acetate copolymer resin and/or a cellulose resin.

15. The oil ink set according to claim 1, characterized by being used for recording onto a polyvinyl chloride base material.

16. The oil ink set according to claim 2, characterized by further containing a cyan ink and/or a black ink.

17. The oil ink set according to claim 5, characterized by further containing a black ink.

18. The oil ink set according to claim 4, characterized in that each oil ink contains at least 50% by mass of a mixed solvent containing 0.02 to 4 parts by mass of a cyclic ester solvent represented by the following general formula (3) per 1 part by mass of the solvents represented by the general formula (1) and/or (2):

$$X_5-CH\ (CH_2)_m\ CH-X_4$$
$$|\qquad\qquad\qquad|$$
$$O\text{———}CO$$

General Formula (3)

wherein $X_3$ and $X_4$ are each a hydrogen atom or an alkyl or alkenyl group having 1 to 7 carbon atoms and may be identical or different, and m stands for an integer of 1, 2 and 3.

19. The oil ink set according to claim 1, characterized in that said (meth) acrylic resin is a homopolymer of methyl (meth)acrylate or a copolymer of methyl (meth)acrylate and butyl (meth)acrylate.

20. The oil ink set according to claim 4, characterized in that said (meth) acrylic resin contains a (meth) acrylic resin obtained by solution polymerization using a radical polymerization initiator in a polyoxyethylene glycol dialkyl ether solvent represented by said general formula (1) and/or a polyoxyethylene (alkylene) glycol alkyl ether acetate solvent represented by said general formula (2).

21. The oil ink set according to claim 4, characterized in that said (meth) acrylic resin has a glass transition temperature (Tg) of 70° C. or higher.

22. The oil ink set according to claim 4, characterized in that said (meth) acrylic resin has a weight-average molecular weight of 8,000 to 100,000.

23. The oil ink set according to claim 4, characterized in that as said fixing resin, the (meth) acrylic resin is used in combination with a vinyl chloride/vinyl acetate copolymer resin and/or a cellulose resin.

24. The oil ink set according to claim 4, characterized by being used for recording onto a polyvinyl chloride base material.

* * * * *